US012761467B2

(12) United States Patent
Yao et al.

(10) Patent No.: US 12,761,467 B2
(45) Date of Patent: Oct. 13, 2026

(54) SCANNING DEVICE, DRIVING CONDITION SETTING METHOD, AND SCANNING DISPLAY MODULE

(71) Applicant: ChengDu IDEALSEE Technology Co., Ltd., Chengdu (CN)

(72) Inventors: Changcheng Yao, Chengdu (CN); Chongyang Wang, Chengdu (CN); Hongbo Wang, Chengdu (CN)

(73) Assignee: ChengDu IDEALSEE Technology Co., Ltd., Chengdu (CN)

( * ) Notice: Subject to any disclaimer, the term of this patent is extended or adjusted under 35 U.S.C. 154(b) by 1043 days.

(21) Appl. No.: 17/818,288

(22) Filed: Aug. 8, 2022

(65) Prior Publication Data

US 2023/0091656 A1 Mar. 23, 2023

Related U.S. Application Data

(63) Continuation of application No. PCT/CN2022/100438, filed on Jun. 22, 2022.

(30) Foreign Application Priority Data

Sep. 18, 2021 (CN) .......................... 202111127410.9

(51) Int. Cl.
*G02B 26/08* (2006.01)
*G02B 26/10* (2006.01)

(52) U.S. Cl.
CPC ....... *G02B 26/0833* (2013.01); *G02B 26/101* (2013.01)

(58) Field of Classification Search
CPC . G02B 26/0833; G02B 26/101; G02B 26/103
See application file for complete search history.

(56) References Cited

U.S. PATENT DOCUMENTS

| | | | |
|---|---|---|---|
| 6,845,190 B1 | 1/2005 | Smithwick et al. | |
| 2004/0100679 A1 | 5/2004 | Kuo | |
| 2016/0051131 A1 | 2/2016 | Jeong et al. | |
| 2018/0267295 A1* | 9/2018 | Dalrymple ........... | G02B 26/103 |

FOREIGN PATENT DOCUMENTS

| | | |
|---|---|---|
| CN | 102525384 A | 7/2012 |
| CN | 109581654 A | 4/2019 |
| CN | 110402409 A | 11/2019 |
| CN | 110426842 A | 11/2019 |
| CN | 111381361 A | 7/2020 |
| JP | 2012118290 A | 6/2012 |
| JP | 2013195485 A | 9/2013 |
| JP | 2014240893 A | 12/2014 |

* cited by examiner

*Primary Examiner* — Euncha P Cherry
(74) *Attorney, Agent, or Firm* — HSML P.C.

(57) ABSTRACT

A scanning device, a driving condition setting method, and a scanning display module are provided. The scanning device includes two scanning axes capable of vibrating in a first direction and a second direction. The two scanning axes have different frequency characteristics, and the frequency characteristics of the two scanning axes satisfy that a quantity of significant peaks on a frequency characteristic curve does not exceed a set quantity in a set frequency range.

20 Claims, 16 Drawing Sheets

SCANNING DEVICE, DRIVING CONDITION SETTING METHOD, AND SCANNING DISPLAY MODULE

CROSS-REFERENCE

This application is a continuation of international application PCT/CN2022/100438 filed on Jun. 22, 2022, and entitled "SCANNING DEVICE, DRIVING CONDITION SETTING METHOD, AND SCANNING DISPLAY MODULE", which is incorporated herein by reference.

TECHNICAL FIELD

This application relates to the field of display technologies, in particular, to a scanning device, a driving condition setting method, and a scanning display module.

BACKGROUND

Laser scanning display, as a new display imaging technology, can implement scanning display by using a scanning device, for example, a micro-electro-mechanical system (MEMS) scanning mirror or an optical fiber scanner ((for brevity, "optical fiber")). The technology may be applied to a plurality of display scenarios such as projection display and near-eye display.

In actual application, to achieve a good display effect, the scanning device is in a high-frequency vibration state and becomes a complex vibration system. Therefore, it is necessary to improve designs of characteristics and driving conditions of the scanning device.

SUMMARY

In view of this, this application provides a scanning device, a driving condition setting method, and a scanning display module, to improve performance of the scanning device.

According to an aspect of this application, an embodiment of this application provides a scanning device. The scanning device performs raster scanning in an operating state and includes at least two scanning axes capable of vibrating in a first direction and a second direction. The two scanning axes have different frequency characteristics, and the frequency characteristics of the two scanning axes satisfy:

A quantity of significant peaks on a frequency characteristic curve does not exceed a set quantity in a set frequency range.

According to another aspect of this application, an embodiment of this application provides a driving condition setting method for a scanning device. The driving condition setting method includes at least:

- determining at least a natural frequency corresponding to a scanning axis in the scanning device;
- applying a driving signal to the scanning axis based on the determined natural frequency, and determining an amplitude-extrema frequency based on the driving signal;
- determining, based on the amplitude-extrema frequency and a preset frequency characteristic constraint condition, a driving frequency range of the driving signal for driving the scanning axis; and
- using the determined driving frequency range and amplitude-extrema frequency and the frequency characteristic constraint condition as driving conditions, to complete driving condition setting.

According to another aspect of this application, an embodiment of this application provides a scanning display module. The scanning display module includes at least the scanning device, the light source, and the control circuit that are described above.

Under the control of the control circuit, the light source outputs image light, and then the scanning device outputs the image light to implement scanning display.

Optionally, the scanning device includes a fiber scanner and/or a MEMS scanning mirror.

It is noted that, solely for brevity, "fiber scanner" is used as an abbreviation for "optical fiber scanner" in this application.

BRIEF DESCRIPTION OF THE DRAWINGS

Other features, objectives, and advantages of this application will become more apparent by reading detailed descriptions of non-limitative embodiments provided with reference to the following drawings.

DETAILED DESCRIPTION

Figure 1A:
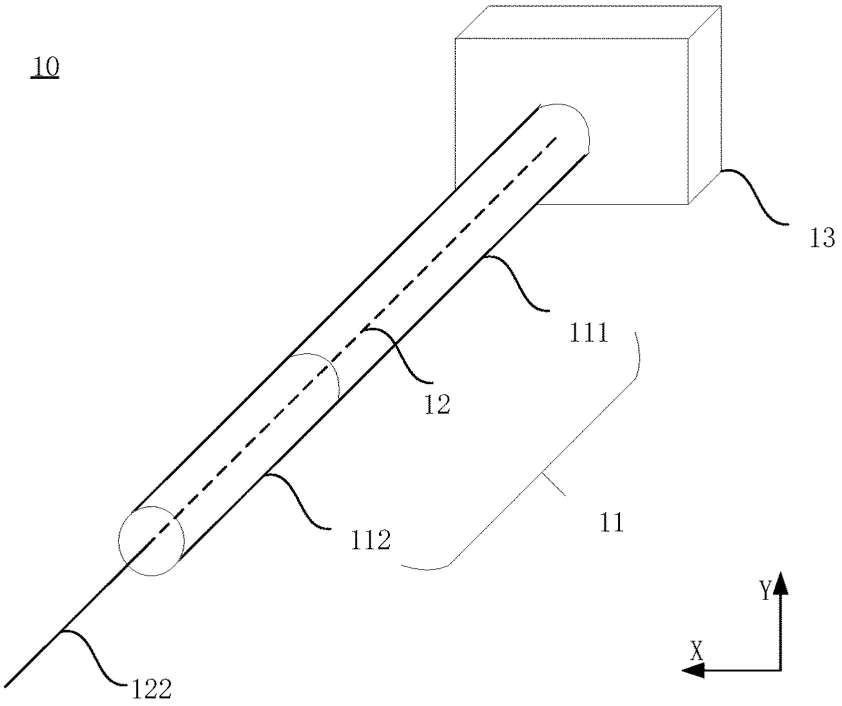
FIG. 1*a* is a schematic diagram of a structure of a scanning device referred to as a fiber scanner according to an embodiment of this application.

The following further describes this application in detail with reference to the drawings and embodiments. It may be understood that specific embodiments described herein are only used to explain the related application, but not to limit the present application. It should also be noted that, for ease of description, only parts related to the related application are shown in the drawings.

With reference to FIG. 1*a*, a scanning device 10 in an embodiment of this application is shown, mainly including an actuator 11 and an optical fiber 12. The scanning device 10 is also referred to as a fiber scanner. In an example of FIG. 1*a*, the entire actuator 11 has a round column shape, and a specific structure may be a round tube or a round rod. When the actuator is a round tube, the entire tube wall is made of a piezoelectric material, and a filling material (for example, epoxy resin) may be filled in the tube. When the actuator is a round rod, the entire rod may be made of a piezoelectric material. In this example, the actuator 11 has a through channel along a length axis direction for mounting the optical fiber 12. One end of the actuator 11 is fixed to a fixing portion 13 (this end may be referred to as a back end), and the other end is free in space and not connected to an external fixing structure (this end may be referred to as a front end/free end). Certainly, the round column structure of the actuator 11 is only an implementable structure, and in different embodiments, the overall shape of the actuator 11 is not limited to the round column shape shown in FIG. 1*a*, but may be a square column shape (a specific structure may be a square tube or a square rod), a triangular column shape (a specific structure may be a triangular tube or a triangular rod), a sheet shape, or the like.

The actuator 11 includes a first actuating portion 111 and a second actuating portion 112 in a direction from back to front, and electrodes (not shown in FIG. 1*a*) are arranged respectively on surfaces of the first actuating portion 111 and the second actuating portion 112 and are configured to receive driving signals to enable the piezoelectric material to generate an inverse piezoelectric effect-based actuating force. In this example, the actuator 11 may be made by using an integrated molding process. However, in other embodiments, the actuator 11 may have a non-integrally molded structure, for example, the first actuating portion 111 and the second actuating portion 112 may be made separately and they together form the actuator 11 by bonding, welding, precision welding, connecting through a connecting structure (for example, a thread and a fastener), or the like.

Figure 1B:
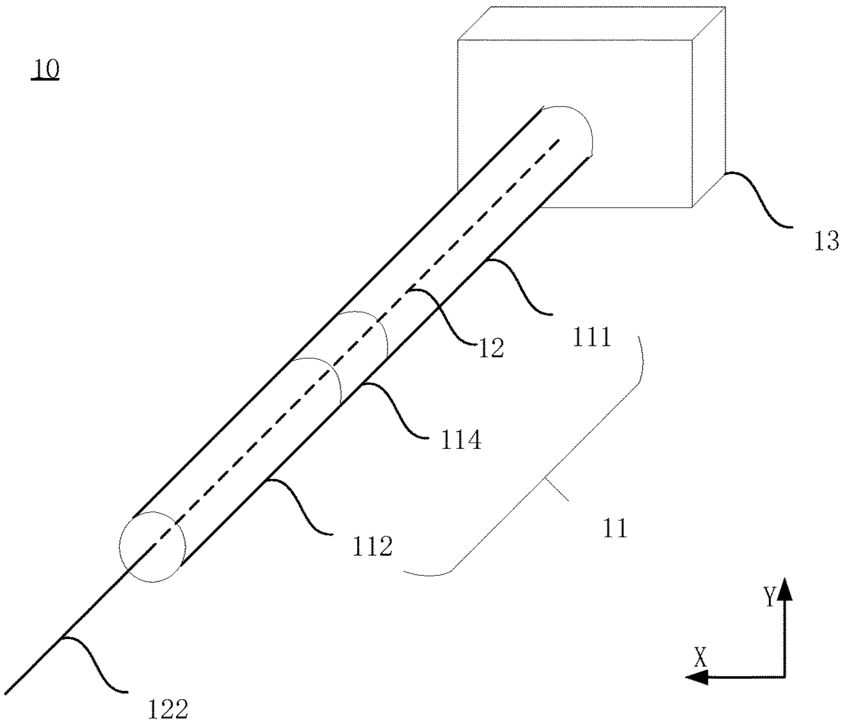
FIG. 1B is a schematic diagram of a structure of another fiber scanner according to an embodiment of this application.

In some embodiments, the actuator 11 may also be provided with an isolation portion 114. As shown in FIG. 1B, the isolation portion 114 is located between the first actuating portion 111 and the second actuating portion 112 and is configured to reduce coupling between the first actuating portion 111 and the second actuating portion 112. A surface of the isolation portion 114 is not provided with an electrode and the isolation portion 114 may not be made of a piezoelectric material, in other words, the isolation portion 114 does not vibrate autonomously.

In the example shown in FIG. 1*a*, the optical fiber 12 penetrates through the actuator 11 along the length axis direction of the actuator 11 and extends at the front end of the actuator 11, to form a cantilevered structure, namely, an optical fiber cantilever 122. Certainly, in some embodiments, the optical fiber 12 may be bonded to a surface of the actuator 11 and extend at the front end of the actuator 11 to form an optical fiber cantilever instead of penetrating.

In some examples, the actuator 11 is made of a piezoelectric material and can implement piezoelectric actuation. In other examples, the actuator 11 may be made of a non-piezoelectric material, and is actuated through electromagnetic actuation, thermal actuation, electrostatic actuation, or the like. In an operating state, under the actuation of the actuator 11, the optical fiber cantilever 122 formed by the optical fiber 12 and extending beyond the actuator 11 can scan in accordance with a set raster trajectory. Certainly, the scanning device 10 may further include a package housing, a lens, a fixed base, and the like. In addition, in actual operation, the scanning device 10 needs to operate together with other components such as a light source and a driving circuit, to implement scanning display. For details, refer to contents corresponding to FIG. 15 and FIG. 16, and the details are not described herein. It should be understood that the shapes and dimensions of the scanning devices 10 shown in FIG. 1*a* and FIG. 1B are exemplary. For example, in each of the embodiments shown in FIG. 1*a* and FIG. 1B, the length of the first actuating portion 111 is greater than that of the second actuating portion 112, but in anther embodiment, the lengths of the two may be the same. For another example, in each of the embodiments shown in FIG. 1*a* and FIG. 1B, the fixing portion 13 is cuboid-shaped, but in another embodiment, the fixing portion in the scanning device is not cuboid-shaped. In some embodiments, the fixing portion 13 is a part of a package structure. In other words, the structural drawings shown in the embodiments of this application are intended to facilitate understanding of the solution and should not be construed as a limitation on this application.

For the actuator 11 in an operating state, the first actuating portion 111 vibrates at a first frequency in a first direction (namely, the Y-axis direction of a reference coordinate system in FIG. 1*a*), and the second actuating portion 112 vibrates at a second frequency in a second direction (namely, the X-axis direction of the reference coordinate system in FIG. 1*a*). Generally, the first frequency is less than the second frequency during raster scanning. Therefore, in some examples, the first actuating portion 111 may also be referred to as a slow-axis actuating portion 111, and the second actuating portion 112 may also be referred to as a fast-axis actuating portion 112. The optical fiber cantilever 122 is driven to scan along a raster trajectory under a synergistic action of vibrations generated by the first actuating portion 111 and the second actuating portion 112. Therefore, in this embodiment of this application, the first actuating portion 111 and the second actuating portion 112 may also be regarded as two scanning axes of the fiber scanner.

In this embodiment of this application, the slow-axis actuating portion and the fast-axis actuating portion each may have a natural frequency based on one or more attributes. Generally, a natural frequency is an intrinsic frequency characteristic of a device, and in some examples, the natural frequency and a resonance frequency (or resonant frequency) are equivalent. The one or more attributes include but are not limited to: a material, a Young's modulus, a second axial moment of area, a density, a sectional area, a length, and/or a mode constant. Usually, the natural frequencies of the fast-axis actuating portion and the slow-axis actuating portion are different. It should also be noted that the natural frequency of the actuator in this application does not just have one frequency point, but has a series of frequency points distributed according to a specific law, that is, has a plurality of orders (Order).

The optical fiber may also have a natural frequency based on one or more attributes, and the one or more attributes may include but are not limited to: an optical fiber cantilever length, a fiber cross-sectional shape, a fiber cross-sectional size, and a material. Similarly, the natural frequency of the optical fiber also has a plurality of orders. Certainly, the natural frequency of the optical fiber described in this application mainly refers to a natural frequency of the optical fiber cantilever.

Ideally, when the natural frequency of the slow-axis actuating portion, the natural frequency of the fast-axis actuating portion, and the natural frequency of the optical fiber are matched, the optical fiber cantilever 122 can obtain a larger swing in an operating state. For example, in some examples, the matching refers to that the natural frequency of the slow-axis actuating portion and the natural frequency of the fast-axis actuating portion each are equal to or close to the natural frequency of the optical fiber. In some other embodiments, the matching refers to that in a same order, there is a difference between the natural frequency of the optical fiber and each of the natural frequency of the slow-axis actuating portion and the natural frequency of the fast-axis actuating portion. For example, the difference is tens to thousands of Hz. For another example, the difference between the natural frequencies of the two is close to an integer multiple.

Figure 2:
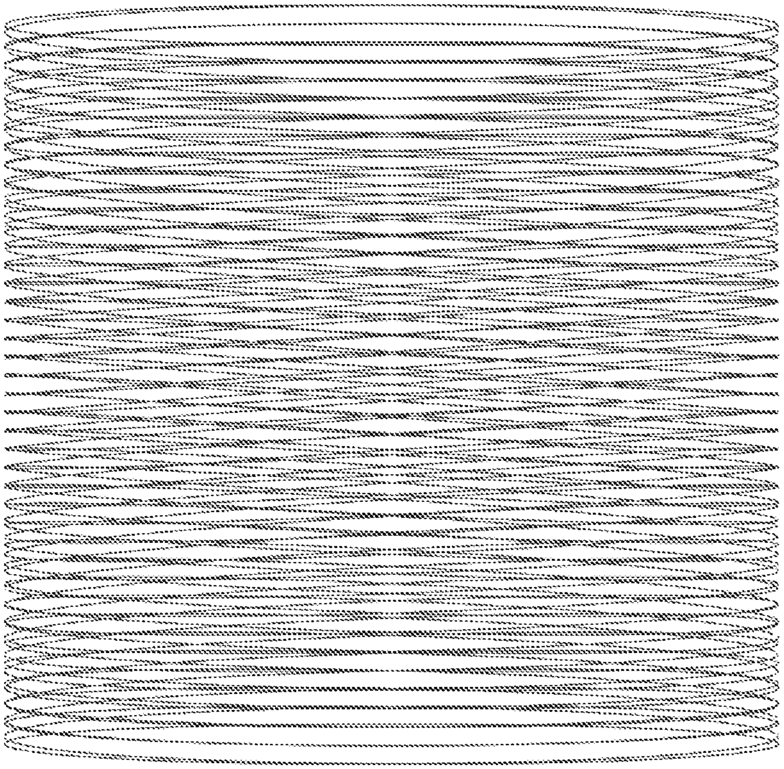
FIG. 2 is a schematic diagram of a raster scanning trajectory affected by nonlinearity.

A larger swing of the optical fiber may be obtained by using the natural frequency of the actuator and/or the natural frequency of the optical fiber, to increase a screen size or field of view. For example, the scanner is driven at the natural frequency of the optical fiber, to obtain the maximum swing of the optical fiber. However, it is found by the inventor of this application that the fiber scanner operating at a resonance frequency point becomes a complex nonlinear vibration system, and responses of the actuator and the optical fiber are nonlinear. Nonlinear vibration causes instability of optical fiber vibration and is easily disturbed and difficult to control, and even a scanning trajectory may deviate from an ideal raster trajectory. Accordingly, cases shown in FIG. 2 or FIG. 3 may occur. When images are displayed, such an abnormal trajectory seriously affects a display effect of the images.

It is further found that not only operating at the resonance frequency point leads to a strong nonlinear phenomenon of the fiber scanner, but also frequency characteristics of the fiber scanner (such as the proximity between the natural frequency of the actuator and the natural frequency of the optical fiber) also affect a nonlinear form of expression of the entire fiber scanner, and even strengthen an influence of the nonlinearity of the actuator on the whole, resulting in an abnormality of a scanning trajectory.

The natural frequencies of the actuator and the optical fiber in the fiber scanner are affected by the foregoing one or more attributes. Therefore, reasonable frequency characteristics may be configured during designing and manufacturing, so that the fiber scanner can achieve a good scanning display effect. For a raster scanning fiber scanner, the fast-axis and slow-axis actuating portions have different frequency characteristics from each other, and when in a vibration state, generate different excitations to the optical fiber cantilever. Accordingly, response characteristics of the optical fiber cantilever to the two excitations are also different, so different frequency characteristics may be respectively configured for a sub-vibration system constituted by the fast-axis actuating portion and the optical fiber cantilever and a sub-vibration system constituted by the slow-axis actuating portion and the optical fiber cantilever.

Figure 4A:
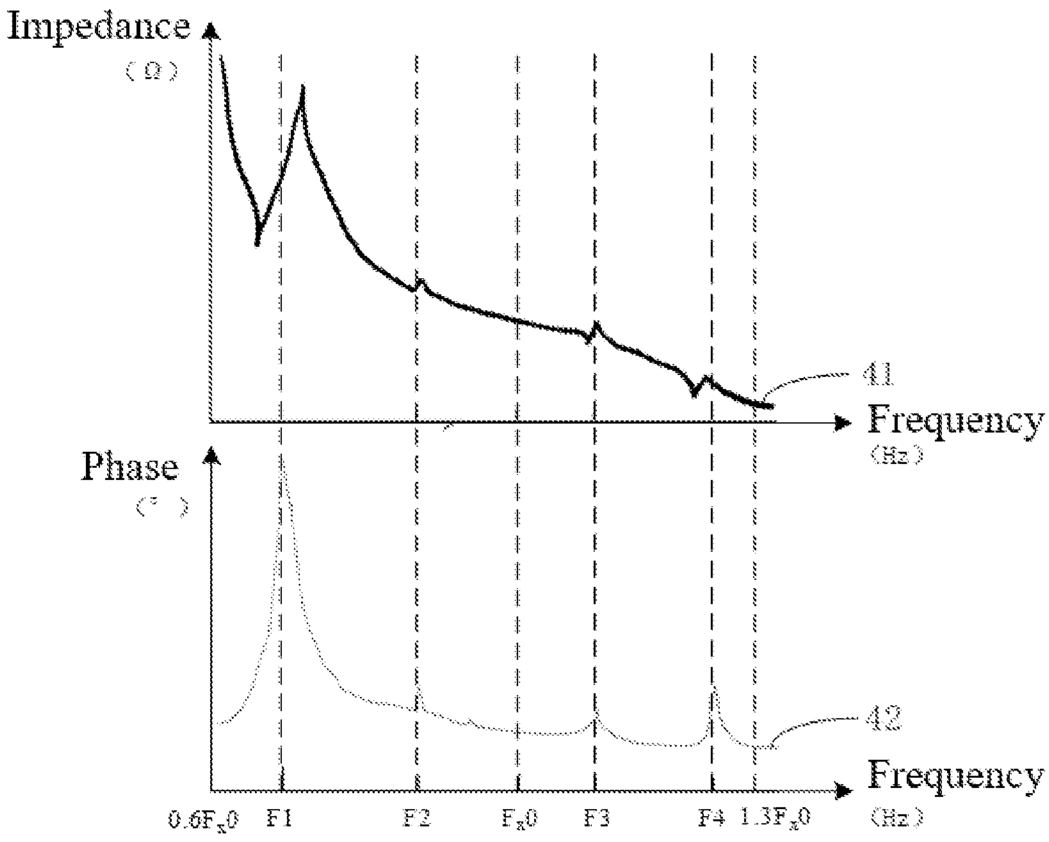
FIG. 4*a* shows a configured frequency characteristic curve corresponding to a fast-axis actuating portion and an optical fiber cantilever of a fiber scanner according to an embodiment of this application.

Specifically, based on the fiber scanner shown in FIG. 1*a*, FIG. 4*a* shows a configured frequency characteristic curve corresponding to the fast-axis actuating portion 112 and the optical fiber cantilever 122 of the fiber scanner, including an impedance curve 41 and a phase curve 42. In FIG. 4*a*, a horizontal axis is a frequency of a driving signal, and the impedance curve 41 shows changes of impedance with the frequency of the driving signal. The phase curve 42 shows changes of a phase with the frequency of the driving signal. F1 to F4 are resonance frequency points, and a driving frequency Fx0 is a frequency that is applied to the fast-axis actuating portion 112 and that has a largest amplitude in a driving (voltage) signal spectrum or a scanning trajectory response spectrum. The scanning trajectory response spectrum may be considered as a spectrum of corresponding response signals generated by a sub-vibration system constituted by the fast-axis actuating portion 112 and the optical fiber cantilever 122 with respect to that a response of a driving (voltage) signal is collected by a corresponding instrument or device.

Both the impedance curve 41 and the phase curve 42 may be measured by a corresponding testing device (for example, an impedance analyzer). Certainly, FIG. 4*a* shows a curve in a specific frequency range, and in practice, a curve in a larger frequency range or a smaller frequency range may be measured by setting a frequency boundary.

For the curve shown in FIG. 4*a*, the impedance curve 41 and the phase curve 42 are similar in line type, that is, have a correlation. Peaks (also referred to as impedance peaks) on the impedance curve 41 can characterize response characteristics or filtering characteristics of the fast-axis actuating portion and/or the optical fiber cantilever to an excitation frequency (namely, a driving frequency) in the frequency range. Peaks (also referred to as phase peaks) on the phase curve 42 can characterize the natural frequencies of the fast-axis actuating portion and/or the optical fiber. The peaks described in this embodiment of this application usually refer to protrusions on the curves in forward directions of the longitudinal axes.

The response characteristics of the fast-axis actuating portion 112 and the optical fiber cantilever 122 can be indicated by the impedance curve 41. Generally, in a specific frequency range of $F_x$ (representing a driving frequency applied to the fast-axis actuating portion 112), the fast-axis actuating portion 112 and the optical fiber cantilever 122 generate a frequency response with respect to the $F_x$, that is, a phenomenon reflected on the impedance curve 41 is that a peak appears on the curve. However, for a sub-vibration system constituted by the fast-axis actuating portion 112 and the optical fiber 12, an actual nonlinear process of a frequency response is complex. As the fast-axis actuating portion 112 vibrates, the optical fiber cantilever 122, as a load of the fast-axis actuating portion 112, follows to vibrate, and a mutual force is generated, which may affect the response characteristic of the fast-axis actuating portion 112 and change a natural frequency characteristic of the device. This changed response characteristic is also reflected on the impedance curve 41, so that a corresponding peak is generated on the impedance curve 41.

Usually, significant degrees of the peaks (which may include characteristics such as sizes, sharpness, and widths of the peaks) on the impedance curve 41 reflect that more significant interaction between the optical fiber and the actuator indicates greater influence on each other. Therefore, in this embodiment of this application, for the sub-vibration system constituted by the fast-axis actuating portion 112 and the optical fiber cantilever 122, to minimize an influence of a complex nonlinear vibration process, configured frequency characteristics satisfy that a quantity of significant peaks on the impedance curve does not exceed a set quantity in a set frequency range.

In some preferred embodiments of this application, configured frequency characteristics of the fast-axis actuating portion 112 and the optical fiber cantilever 122 satisfy that the quantity of significant peaks on the impedance curve 41 does not exceed 5 in a frequency range[$0.6*F_x\mathbf{0}$, $1.3*F_x\mathbf{0}$].

To determine a significant peak, a resonance peak on the phase curve 42 is first determined, in particular based on the following formula:

$$\begin{cases} d_{Pi} = \dfrac{D_{Pi}}{P_{max} - P_{min}} \\ D_{Pi} = P_i - P_{min} \end{cases} \tag{1}$$

In the foregoing formula, $P_i$ is a maximum value (namely, a phase peak) of a phase on the phase curve 42 in the frequency range, and i is a positive integer.

$P_{max}$ is a maximum phase value of the phase curve 42 in the frequency range.

Pmin is a minimum phase value of the phase curve 42 in the frequency range.

$D_{Pi}$ is a difference between a maximum value $P_i$ of each phase in the frequency range and the minimum phase value.

$d_{Pi}$ is a relative value of $D_{Pi}$ and a maximum phase difference in the frequency range.

Based on the above formula, it is calculated that if $d_{Pi}$ is greater than a first predetermined value, a frequency corresponding to $P_i$ is a resonance frequency that may cause an influence, and accordingly, a peak corresponding to $P_i$ may be considered as a resonance peak; or if $d_{Pi}$ is less than the first predetermined value, the frequency corresponding to $P_i$ is a resonance frequency whose influence may be ignored, and accordingly, the peak corresponding to $P_i$ may be considered as a non-resonance peak. In some embodiments, a value range of the first predetermined value is 0.05 to 0.1. For example, the first predetermined value is 0.05. For another example, the first predetermined value is 0.1.

Based on the determined resonance peak, a significant peak may be further determined, in particular based on the following formula:

$$\begin{cases} d_i = \dfrac{D_i}{D_{max}} \\ D_i = Z_{mxi} - Z_{mni} \end{cases} \tag{2}$$

In the foregoing formula, $Z_{mxi}$ is a maximum value closer to $F_i$ in maximum values on the impedance curve between a resonance frequency point $F_i$ and a next resonance frequency point $F_{i+1}$. For example, there are a plurality of maximum values between the resonance frequency point $F_i$ and the next resonance frequency point $F_{i+1}$, the plurality of maximum values respectively correspond to a plurality of frequencies, and a maximum value corresponding to a frequency closest to $F_i$ in the plurality of frequencies is $Z_{mxi}$.

$Z_{mni}$ is a minimum value closer to $F_i$ in minimum values on the impedance curve between the resonance frequency point $F_i$ and a previous resonance frequency point $F_{1-1}$. For example, there are a plurality of minimum values between the resonance frequency point $F_i$ and the previous resonance frequency point $F_{i-1}$, the plurality of minimum values respectively correspond to a plurality of frequencies, and a minimum value corresponding to a frequency closest to $F_i$ in the plurality of frequencies is $Z_{mni}$.

$D_i$ is an impedance difference corresponding to the resonance frequency point $F_i$.

$D_{max}$ is the largest value in all $D_i$ in the foregoing frequency range.

$d_i$ is the relative value of the impedance difference corresponding to the resonance frequency point $F_i$ and $D_{max}$.

In this example, if is greater than or equal to a second predetermined value, a peak corresponding to the resonance frequency point $F_i$ on the impedance curve is a significant peak; or otherwise, it is not a significant peak. A value range of the second predetermined value is 0.1 to 0.2. For example, the second predetermined value is 0.1. For another example, the second predetermined value is 0.2.

Figure 4B:
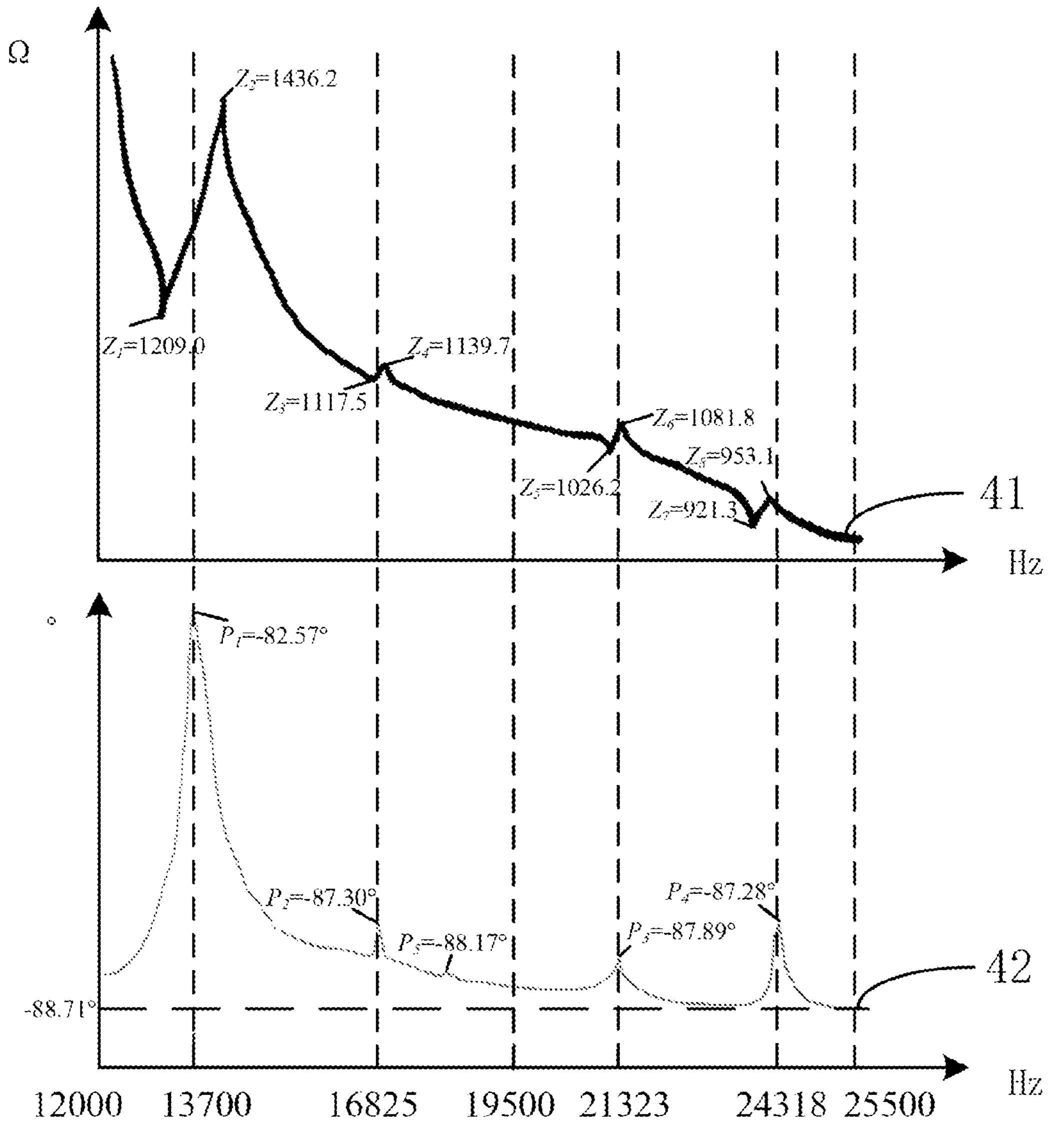
FIG. 4*b* is a schematic diagram of a frequency characteristic curve with specific values.

FIG. 4*b* shows a configured frequency characteristic curve corresponding to the fast-axis actuating portion 112 and the optical fiber cantilever 122 in a frequency range [12000 Hz, 25500 Hz]. There are five phase maximum values, namely, $P_1$ to $P_5$, on the phase curve 42, and specific values of the phase maximum values are as shown in the figure. In this case, based on the formula (1), in this example, phase peaks $P_1$ to $P_4$ on the phase curve 42 are resonance peaks, and accordingly, frequencies corresponding to the phase peaks $P_1$ to $P_4$ are resonance frequencies.

A resonance frequency 13700 Hz is used as an example. In a frequency range defined by the resonance frequency 13700 Hz and a previous resonance frequency (which is not shown on the frequency range shown in FIG. 4*b*) (that is, the left side of the resonance frequency 13700 Hz and the right side of the previous resonance frequency), a minimum value of an impedance close to 13700 Hz may be found on the impedance curve 41, that is, $Z_1$=1209.0Ω in FIG. 4*b*. Similarly, in a frequency range defined by the resonance frequency 13700 Hz and a next resonance frequency (namely, 16825 Hz in FIG. 4*b*), a maximum value of the impedance close to 13700 Hz may be found on the impedance curve 41, that is, $Z_2$=1936.2Ω in FIG. 4*b*, and obviously, $Z_2>Z_1$. Based on the formula (2), an impedance difference $D_1=Z_2-Z_1$ corresponding to the resonance frequency 13700 Hz may be calculated. Impedance differences $D_2$ to $D_4$ corresponding to the remaining resonance frequencies are calculated in the same way, so that a maximum value $D_{max}$ ($D_1$ in FIG. 4*b*) in the impedance differences may be determined, to calculate $d_i$, where i=1 to 4. Therefore, it can be determined whether peaks corresponding to the four resonance frequencies on the impedance curve 41 are significant peaks. In this example, it is calculated that peaks corresponding to the resonance frequency points 13700 Hz, 21323 Hz, and 24318 Hz in FIG. 4*b* on the impedance curve 41 are significant peaks. That is, the foregoing frequency characteristics are satisfied.

Figure 4C:
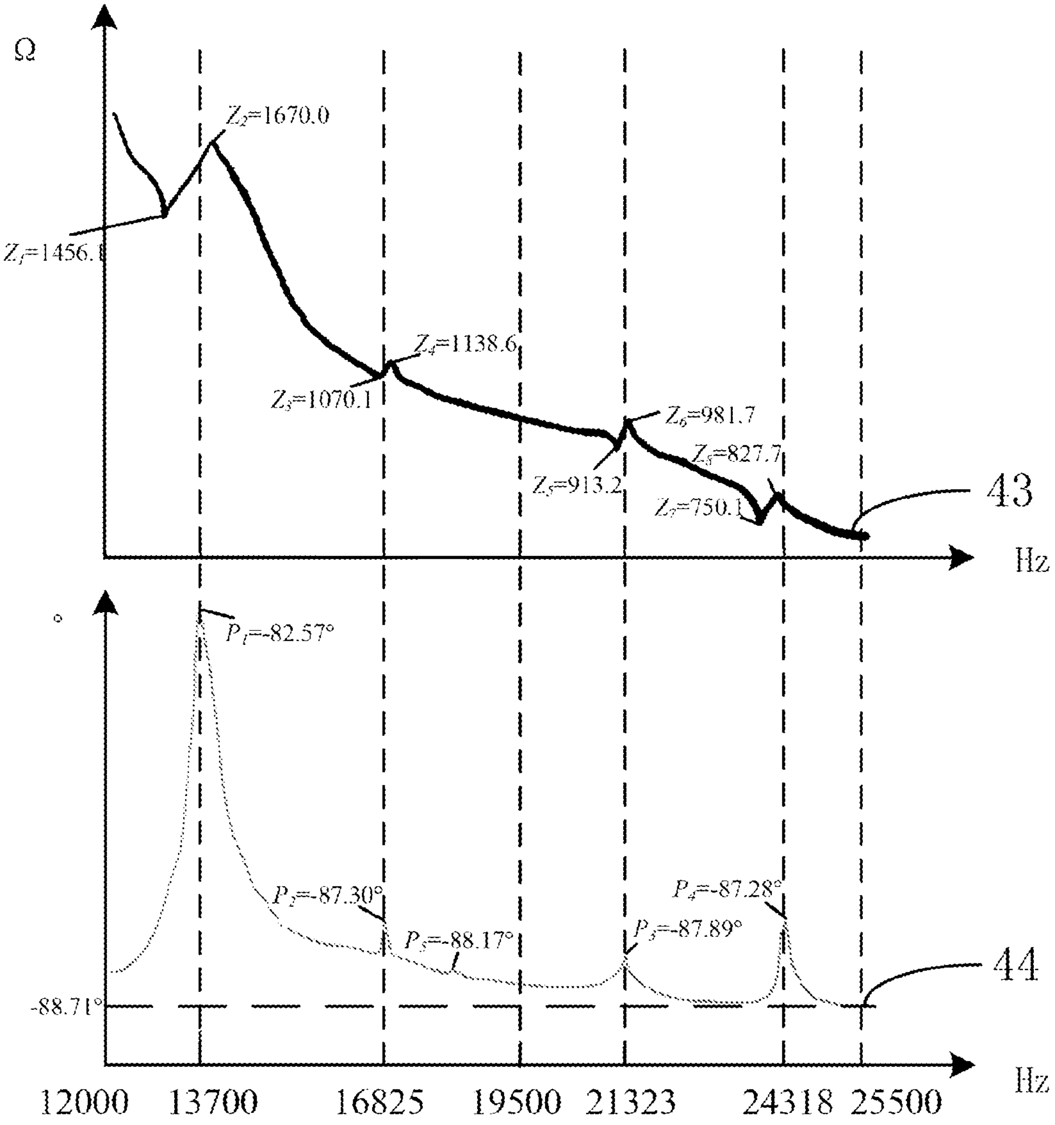
FIG. 4*c* is a schematic diagram of another frequency characteristic curve with specific values.

FIG. 4*c* shows another configured frequency characteristic curve corresponding to the fast-axis actuating portion 112 and the optical fiber cantilever 122 in a frequency range [12000 Hz, 25500 Hz]. There are five phase maximum values, namely, $P_1$ to $P_5$, on a phase curve 44, and specific values of the phase maximum values are as shown in the figure. In this case, based on the formula (1), in this example, phase peaks $P_1$ to $P_4$ on the phase curve 44 are resonance peaks, and accordingly, frequencies corresponding to the phase peaks $P_1$ to $P_4$ are resonance frequencies.

Further, for the resonance frequencies corresponding to the phase peaks $P_1$ to $P_4$, impedance differences $D_i$ on an impedance curve 43 can be calculated based on the formula (2), a maximum value $D_{max}$ in the impedance differences can be determined, and $d_i$ is calculated, where i=1 to 4. In this example, it is calculated that peaks corresponding to resonance frequency points 13700 Hz, 16825 Hz, 21323 Hz, and 24318 Hz in FIG. 4*c* on the impedance curve 43 are significant peaks. That is, the foregoing frequency characteristics are satisfied.

On the impedance curve 41, a more significant impedance peak corresponding to the optical fiber cantilever 122 indicates more significant interaction between the optical fiber and the actuator, and a greater influence between the optical fiber and the actuator indicates a smaller required voltage of a corresponding piezoelectric driver. Therefore, in the solution of this example, a resonance frequency point of the optical fiber cantilever 122 may be configured to be approximately at a resonance frequency F2 or F3. It should be understood that the design or configuration of the frequency characteristics of the optical fiber cantilever 122 may be implemented by performing modeling simulation based on one or more of the foregoing attributes by using a finite element tool. This is not described in more detail herein.

A good scanning display effect can be achieved by using the foregoing configured frequency characteristics of the fiber scanner. This is because, for a vibration system, for example, a raster scanning fiber scanner, responses of both an actuator and an optical fiber are nonlinear, the responses closer to a resonance frequency of the actuator or the optical fiber indicate stronger response nonlinearity, and then a moving trajectory of the optical fiber deviates more from ideal vibration, resulting in that it difficult to control the trajectory, disordered and inaccurate image display and the like are caused, and scanning display quality is affected. In a frequency range near an operating frequency, if there are a plurality of resonance frequencies, an actual response is a result of a joint action of the plurality of resonance frequencies, resulting that a nonlinear process is complex. Therefore, significant resonance peaks on the impedance curve in the foregoing set frequency range should be as few as possible. Therefore, in this example, the frequency characteristics of the sub-vibration system constituted by the fast-axis actuating portion 112 and the optical fiber 12 are configured, to control a quantity of significant peaks in the set frequency range near the operating frequency to be less than a set quantity, so that nonlinear characteristics caused by a common influence of resonance frequencies corresponding to the significant peaks in the frequency range on an actual response are effectively alleviated, and further the moving trajectory of the optical fiber is closer to an ideal raster moving trajectory, to ensure ordered and accurate image display.

Figure 5:
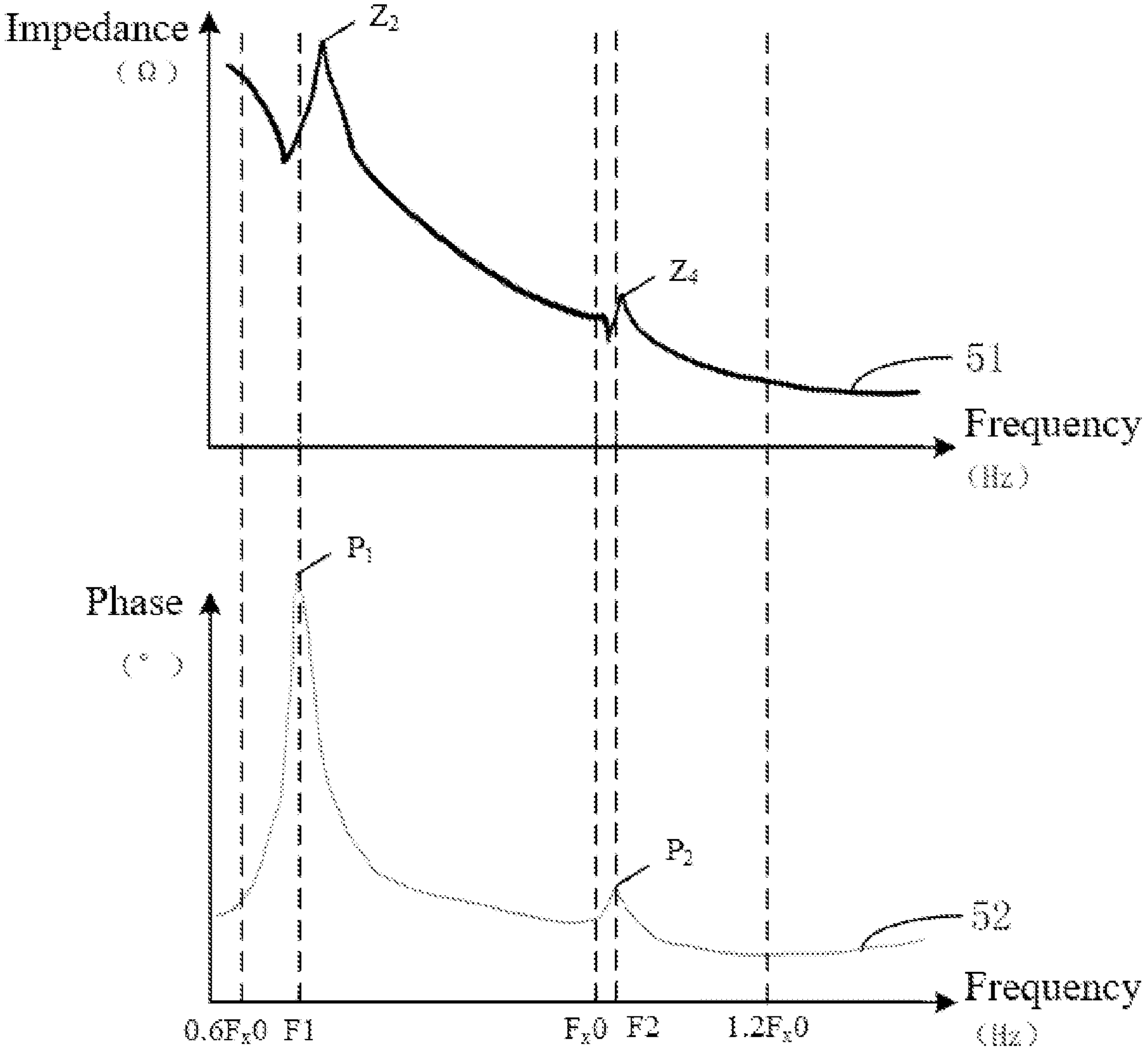
FIG. 5 shows a configured frequency characteristic curve corresponding to a fast-axis actuating portion and an optical fiber cantilever of a fiber scanner according to an embodiment of this application.

FIG. 5 shows another configured frequency characteristic curve corresponding to the fast-axis actuating portion 112 and the optical fiber cantilever 122 of the fiber scanner. An impedance curve 51 and a phase curve 52 are shown in FIG. 5. F1 and F2 are resonance frequency points, and $F_x$0 is a frequency that is applied to the fast-axis actuating portion 112 and that has a largest amplitude in a driving (voltage) signal spectrum or a scanning trajectory time sequence spectrum. The resonance frequency points F1 and F2 respectively correspond to two impedance peaks $Z_2$ and $Z_4$ on the impedance curve 51, and respectively correspond to two phase peaks $P_1$ and $P_2$ on the phase curve 52.

As a preferred example, the configured frequency characteristics of the fast-axis actuating portion 112 and the optical fiber cantilever 122 satisfy that a quantity of significant peaks on the impedance curve 51 is 2 in a frequency range [0.6*$F_x$0, 1.2*$F_x$0] (namely, a frequency range shown in FIG. 5). The impedance peaks $Z_2$ and $Z_4$ in FIG. 5 are significant peaks.

Figure 6:
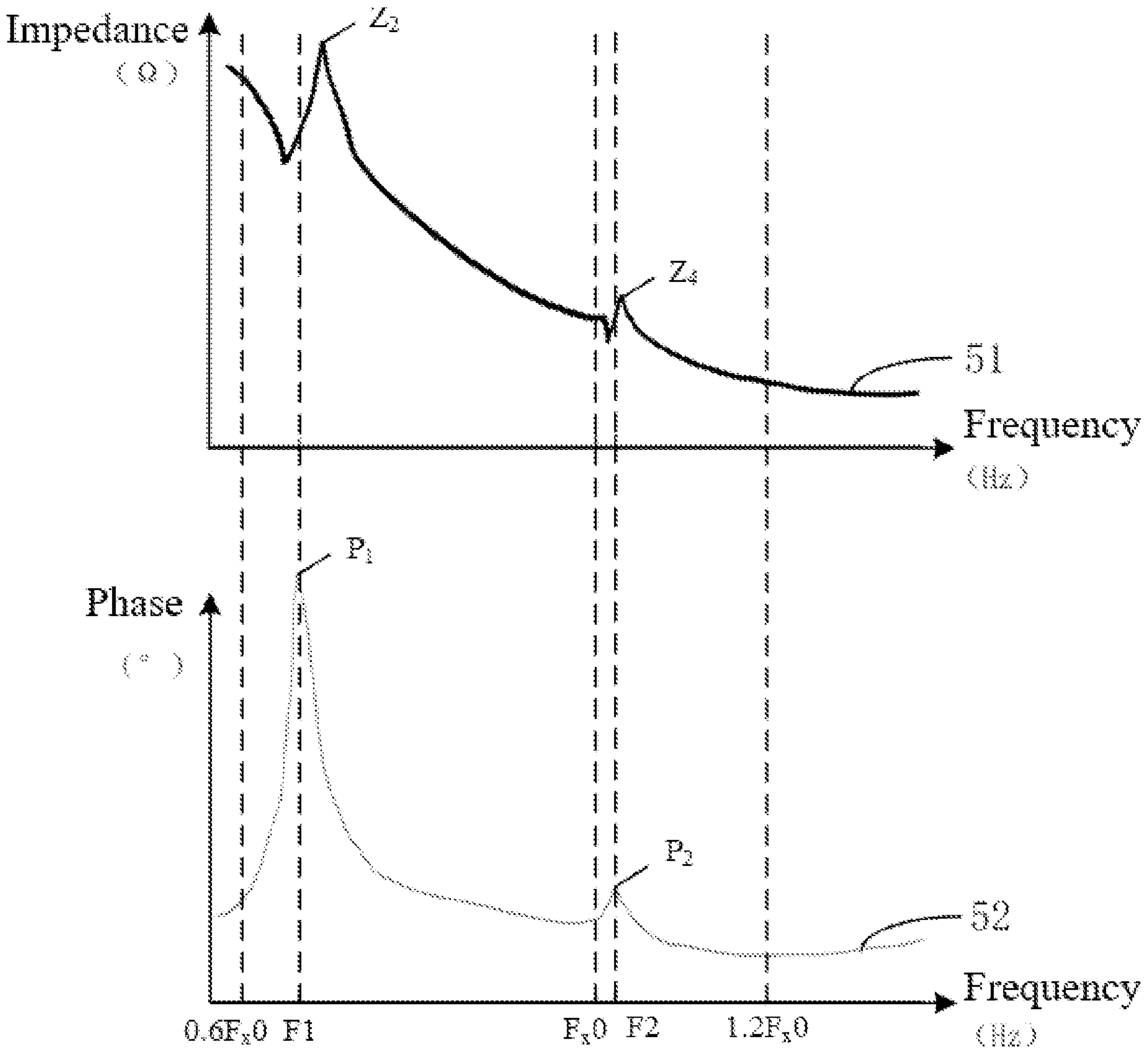
FIG. 6 shows a configured frequency characteristic curve corresponding to a fast-axis actuating portion and an optical fiber cantilever of a fiber scanner according to an embodiment of this application.

FIG. 6 shows another configured frequency characteristic curve corresponding to the fast-axis actuating portion 112 and the optical fiber cantilever 122 of the fiber scanner. An impedance curve 61 and a phase curve 62 are shown in FIG. 6. F1 and F2 are resonance frequency points, and $F_x$0 is a frequency that is applied to the fast-axis actuating portion 112 and that has a largest amplitude in a driving (voltage) signal spectrum or a scanning trajectory time sequence spectrum. The resonance frequency point F1 corresponds to an impedance peak $Z_2$ on the impedance curve 61 and corresponds to a phase peak $P_1$ on the phase curve 62. A peak shape of the frequency point F2 on the impedance curve 61 is not obvious, and similarly, a peak shape on the phase curve 62 is not obvious.

As a preferred example, the configured frequency characteristics of the fast-axis actuating portion 112 and the optical fiber cantilever 122 satisfy that a quantity of significant peaks on the impedance curve 61 is 1 in a frequency range [0.6*$F_x$0, 1.1*$F_x$0] (namely, a frequency range shown in FIG. 6), that is, the significant peak is the impedance peak $Z_2$.

Figure 7:
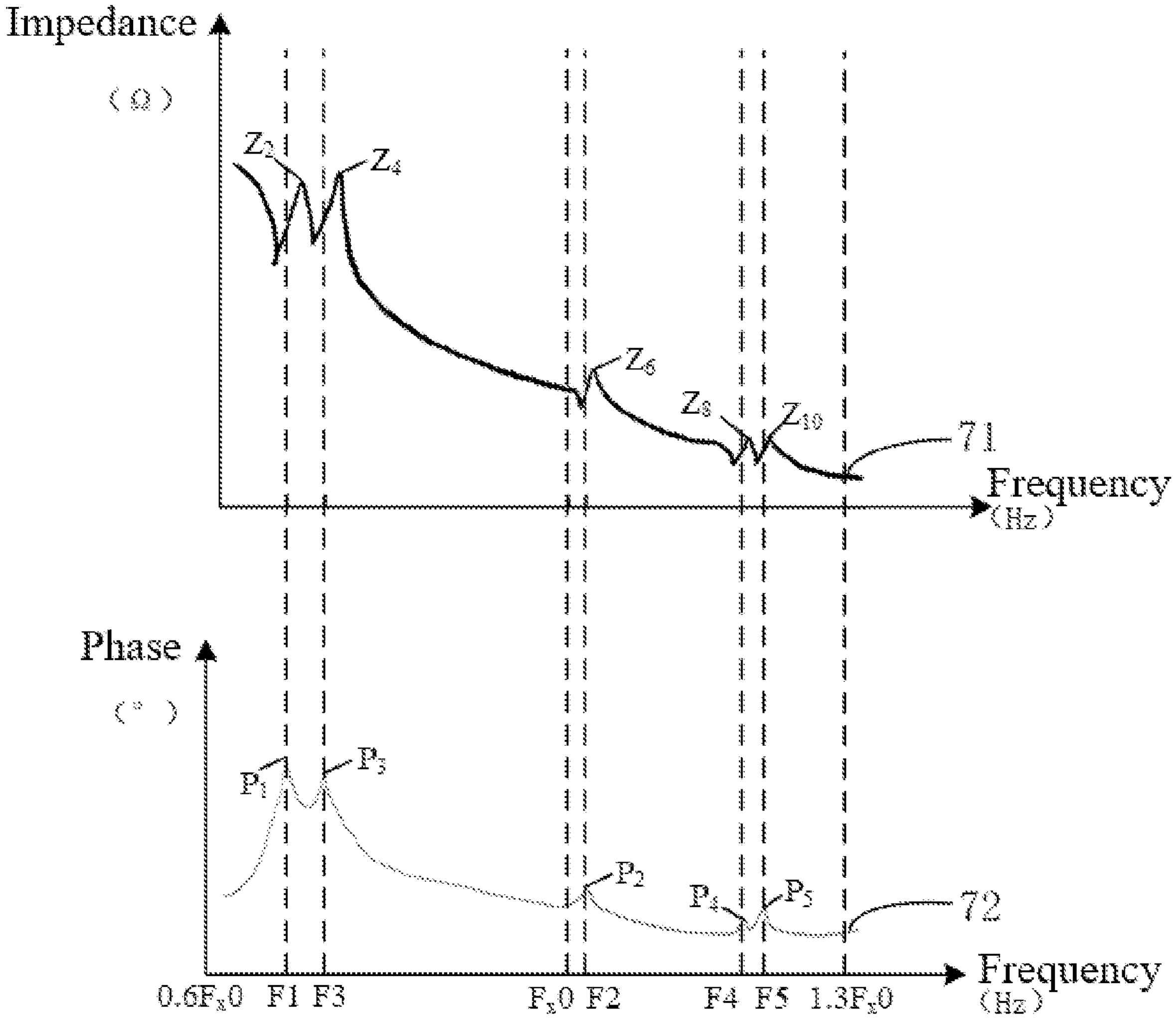
FIG. 7 shows a configured frequency characteristic curve corresponding to a fast-axis actuating portion and an optical fiber cantilever of a fiber scanner according to an embodiment of this application.

FIG. 7 shows another configured frequency characteristic curve corresponding to the fast-axis actuating portion 112 and the optical fiber cantilever 122 of the fiber scanner. An impedance curve 71 and a phase curve 72 are shown in FIG. 7. F1 to F5 are resonance frequency points, and $F_x$0 is a frequency that is applied to the fast-axis actuating portion 112 and that has a largest amplitude in a driving (voltage) signal spectrum or a scanning trajectory time sequence spectrum. The resonance frequency points F1 to F5 respectively correspond to five impedance peaks $Z_2$ to $Z_{10}$ on the impedance curve 71, and respectively correspond to five phase peaks $P_1$ to $P_5$ on the phase curve 72.

As a preferred example, the configured frequency characteristics of the fast-axis actuating portion 112 and the optical fiber cantilever 122 satisfy that a quantity of significant peaks on the impedance curve 71 is 5 in a frequency range [0.6*$F_x$0, 1.3*$F_x$0] (namely, a frequency range shown in FIG. 7). All the impedance peaks $Z_2$ to $Z_{10}$ in FIG. 7 are significant peaks.

With respect to the configured frequency characteristics of the fast-axis actuating portion 112 and the optical fiber cantilever 122 of the fiber scanner, generally, the resonance frequency F1 corresponds to a resonance frequency of the fast-axis actuating portion 112, and the resonance frequency F2 corresponds to a resonance frequency of the optical fiber cantilever 122.

Therefore, in a preferred example, a frequency difference between the resonance frequencies F1 and F2 is greater than 1.2 KHz.

In another preferred example, the frequency difference between the resonance frequencies F1 and F2 is less than 5 KHz.

In a preferred example, a frequency difference between the driving frequency $F_x$0 and the resonance frequency F2 is less than 100 Hz. Since the values of the two frequencies are very close, the driving frequency $F_x$0 and the resonance frequency F2 may be considered to be approximately equal.

Figure 17:
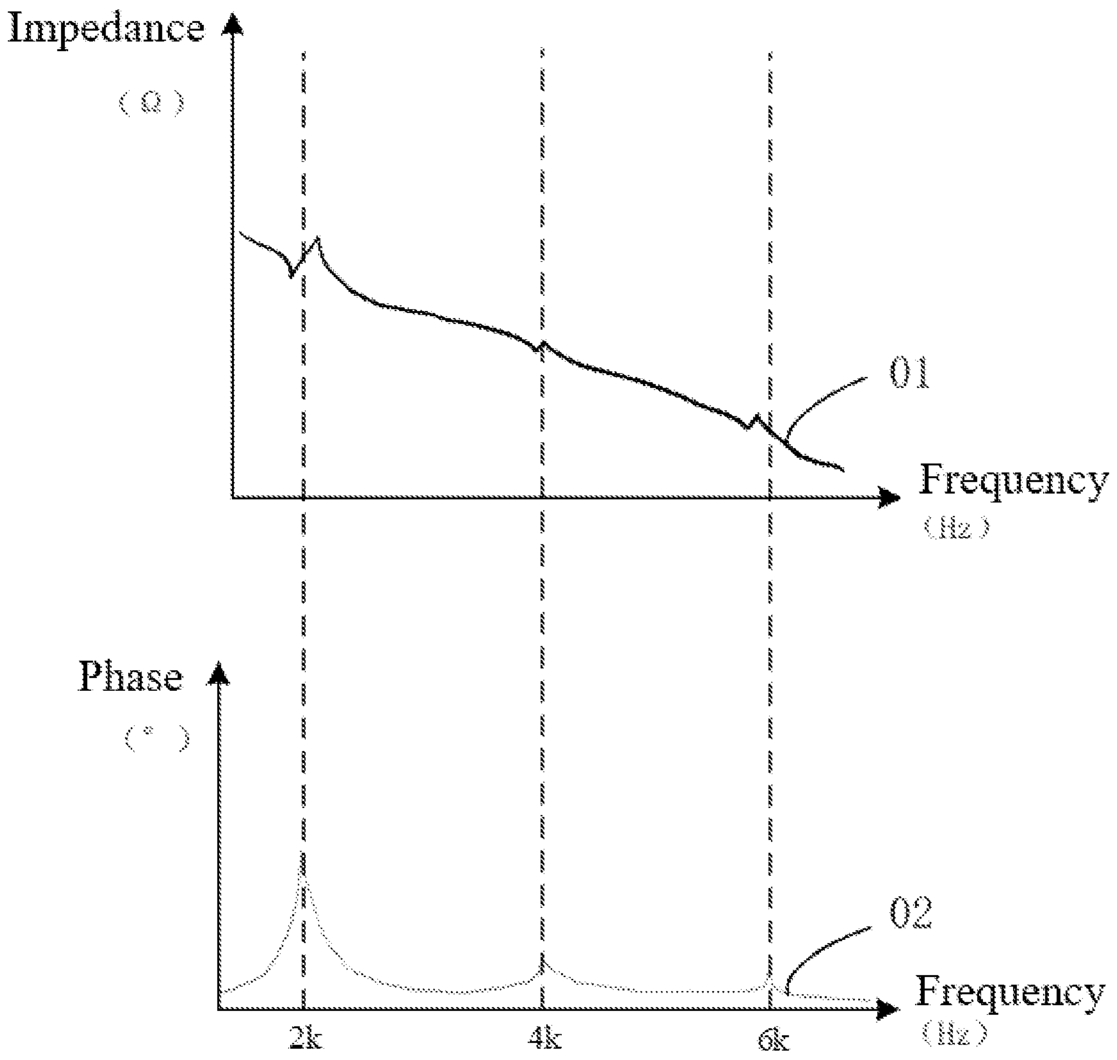
FIG. 17 shows a frequency characteristic curve corresponding to multiplied frequencies of a fast-axis actuating portion according to an embodiment of this application.

In some practical application cases, there may be a scenario in which the driving frequency of the fast-axis actuating portion 112 needs to be increased, and the increased driving frequency may reach a multiple of the resonance frequency F1 of the fast-axis actuating portion 112, that is, be a multiplied frequency. FIG. 17 shows a frequency characteristic curve corresponding to multiplied frequencies of the fast-axis actuating portion 112, including an impedance curve 01 and a phase curve 02. Three multiplied frequency points 2 kHz, 4 kHz, and 6 kHz corresponding to the fast-axis actuating portion 112 are shown in FIG. 17, and there are corresponding peaks near the three frequency points on both the impedance curve 01 and the phase curve 02. Such a frequency characteristic affects an operating state of the fast-axis actuating portion 112, which may further cause the optical fiber cantilever 122 to easily produce an undesired nonlinear response, resulting in that a trajectory of the tip of the optical fiber cantilever 122 is uncontrolled.

To avoid the nonlinear response of the optical fiber cantilever 122 to the greatest extent, the sub-vibration system constituted by the second actuating portion 112 and the optical fiber cantilever 122 satisfies the frequency characteristic that there is no significant peak on the impedance curve in a frequency range ($n^*F_x$0−200 Hz, $n^*F_x$0+200 Hz). n represents a multiple, and n=2, 3, 4, 5, . . . , or the like.

It should be noted herein that since the actuator and the optical fiber each have natural frequencies of a plurality of orders, the frequency range in the foregoing may include a natural frequency of a corresponding order of the actuator and/or a natural frequency of a corresponding order of the optical fiber. In this embodiment of this application, the natural frequency of the fast-axis actuating portion 112 may be denoted as $Fk_i$, and the natural frequency of the optical fiber cantilever may be denoted as $Ff_j$. i and j are positive integers corresponding to different orders of the natural frequencies. For example, $Fk_2$ represents a second-order natural frequency of a fast axis, and $Ff_1$ represents a first-order natural frequency of the optical fiber cantilever.

A spectrum positional relationship between an $i^{th}$-order natural frequency $Fp_i$ of the fast-axis actuating portion 112, a $j^{th}$-order natural frequency $Ff_j$ of the optical fiber cantilever 122, and the driving frequency $F_x$0 may be as follows:

$$F_x0>Fk_i>Ff_j;\ Fk_i>F_x0>Ff_j;\ Fk_i>Ff_j>F_x0;$$

$$F_x0>Ff_j>Fk_i;\ Ff_j>F_x0>Fk_i;\ \text{and}\ Ff_i>Fk_i>F_x0.$$

Usually, a frequency difference between the driving frequency $F_x$0 and the $j^{th}$ natural frequency $Ff_j$ of the optical fiber cantilever 122 does not exceed 1000 Hz.

In the foregoing example, the frequency characteristic configured for the sub-vibration system constituted by the fast-axis actuating portion 112 and the optical fiber cantilever 122 is described.

Figure 8:
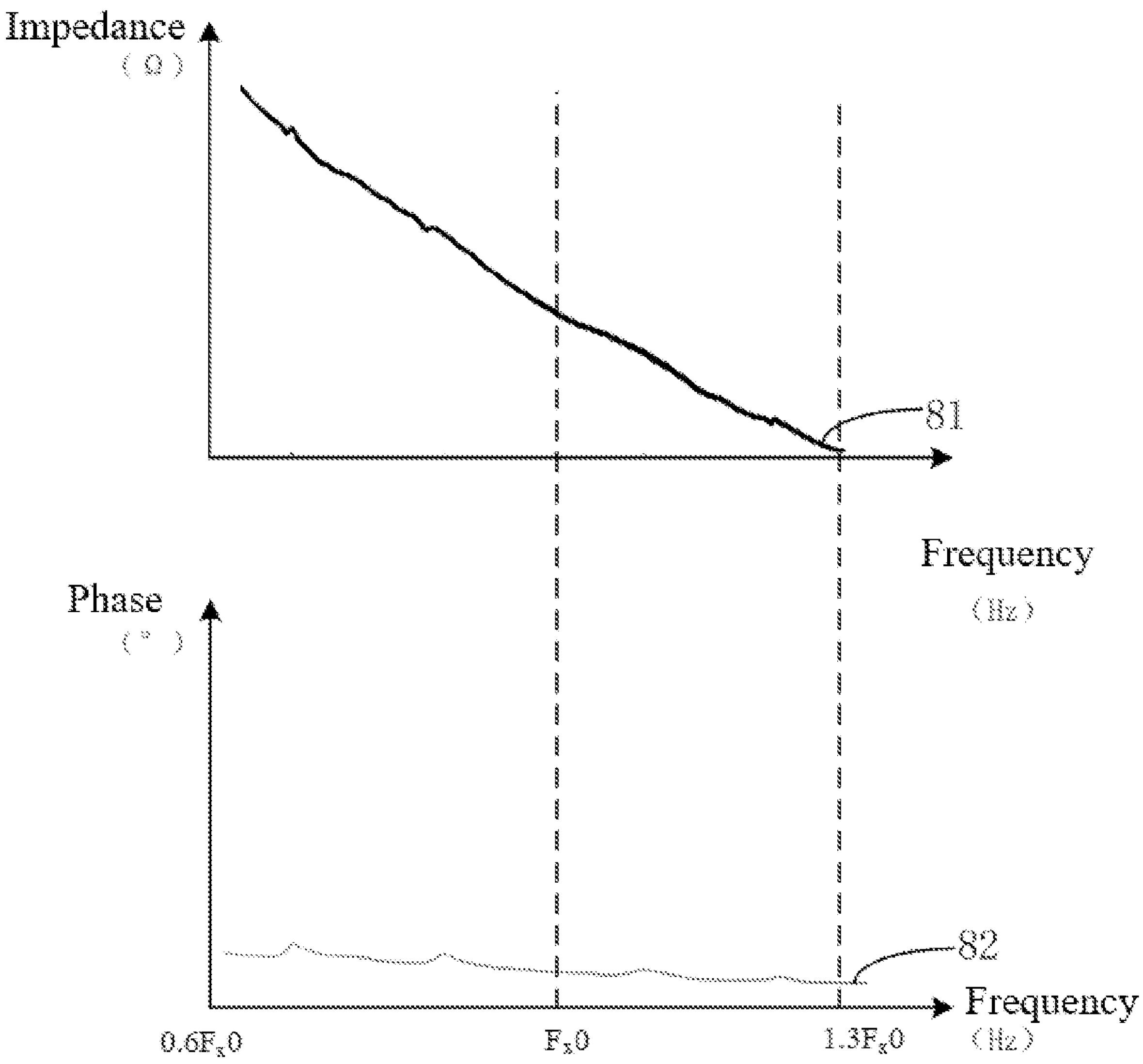
FIG. 8 shows a configured frequency characteristic curve corresponding to a slow-axis actuating portion and an optical fiber cantilever of a fiber scanner according to an embodiment of this application.

Based on the fiber scanner shown in FIG. 1*a*, FIG. 8 shows a configured frequency characteristic curve corresponding to the slow-axis actuating portion 111 and the optical fiber cantilever 122 of the fiber scanner, including an impedance curve 81 and a phase curve 82.

It should be noted that, for an integrated structure including the fast-axis actuating portion and the slow-axis actuating portion shown in FIG. 1*a*, vibrations of the fast-axis actuating portion and the slow-axis actuating portion are coupled to a certain extent in an operating state, to be specific, the vibration at a lower frequency of the slow-axis actuating portion is transmitted to the fast-axis actuating portion, and the vibration at a higher frequency of the fast-axis actuating portion is transmitted to the slow-axis actuating portion. Due to the phenomenon of coupling, the slow-axis actuating portion also shows a certain degree of high-frequency response, which may be detected by the foregoing testing device during an actual test. However, in practical application, due to deviations of process links, strong coupling may be generated by the fast-axis actuating portion and the slow-axis actuating portion, and corresponding peaks are detected near positions corresponding to the significant peaks in the frequency range [$0.6^*F_x$0, $1.3^*F_x$0] on the slow-axis actuating portion.

That is, the fast and slow axes present strong coupling characteristics, and the coupling characteristics will lead to a more complex optical fiber scanning trajectory and therefore should be avoided as far as possible.

Therefore, the sub-vibration system constituted by the slow axis actuator 111 and the optical fiber cantilever 122, may be configured with a corresponding frequency characteristic.

In some examples, the relatively significant peaks detected on the frequency characteristic curve corresponding to the fast-axis actuating portion 112 and the optical fiber cantilever 122 are relatively insignificant on the frequency characteristic curve corresponding to the slow-axis actuating portion 111 and the optical fiber cantilever 122, that is, as shown in FIG. 8, the peaks on the impedance curve 81 are not significant, the phase curve 82 presents clutter information similar to noise signals, and there is no obviously recognizable protrusion.

In some examples, in the frequency range corresponding to the frequency characteristic curve shown in FIG. 8, a peak within 500 Hz away from $F_x$0 is not significant. If the peak is the most significant peak in the frequency range, the peak satisfies: $(Z_{mx}-Z_{mn})/(Z_{mx}+Z_{mn})\leq 5\%$, where $Z_{mx}$ is an impedance maximum value corresponding to the most significant peak, and $Z_{mn}$ is an impedance minimum value adjacent to the most significant peak on the impedance curve 81.

In some examples, the peaks closest to $F_x$0 (not necessarily significant peaks) on the frequency characteristic curve corresponding to the fast-axis actuating portion and the slow-axis actuating portion are staggered from each other by a distance greater than 80 Hz.

Similarly, in some practical application cases, there may be a scenario in which the driving frequency of the slow-axis actuating portion 111 needs to be increased, and the slow-axis actuating portion 111 is also affected by a multiplied frequency. Therefore, in some preferred examples, a resonance frequency Fm of the slow-axis actuating portion 111 satisfies a frequency characteristic that there is no significant peak on the impedance curve in a frequency range (n*Fm−20, n*Fm+20). n represents a multiple, and n=2, 3, 4, 5, . . . , or the like.

In addition, in some preferred examples, there is no resonance peak in a frequency range ($0.9^*n^*F_y$, $1.1^*n^*F_y$) (this frequency range is not shown in FIG. 8). $F_y$ is a driving frequency applied to the slow-axis actuating portion 111, and n=2, 3, 4, 5, . . . , or the like. Further, similar to the foregoing $F_x$0, $F_y$ may be considered as a frequency that is applied to the slow-axis actuating portion 111 and that has a largest amplitude in a driving (voltage) signal spectrum or a scanning trajectory response spectrum. The scanning trajectory response spectrum herein may be considered as a spectrum of corresponding response signals generated by a sub-vibration system constituted by the slow-axis actuating portion 111 and the optical fiber cantilever 122 with respect to that a response of a driving (voltage) signal is collected by a corresponding instrument or device.

Based on the foregoing configured frequency characteristics of the fiber scanner, nonlinear responses can be reduced, under the action of the configured frequency characteristics, by the sub-vibration system constituted by the slow-axis actuating portion and the optical fiber cantilever or the sub-vibration system constituted by the fast-axis actuating portion and the optical fiber cantilever when the fiber scanner is in an operating state. On the one hand, by configuring the frequency characteristics of the sub-vibration system constituted by slow-axis actuating portion and the optical fiber cantilever, when the fiber scanner is in the operating state, no strong coupling is generated between the vibration of the slow-axis actuating portion and the vibration of the fast-axis actuating portion, and complexity of a nonlinear process is reduced. On the other hand, by configuring the frequency characteristics of the sub-vibration system constituted by the fast-axis actuating portion and the optical fiber cantilever, nonlinear characteristics caused by a common influence of resonance frequencies corresponding to significant peaks in a frequency range on an actual response are effectively alleviated, and further the moving trajectory of the optical fiber is closer to an ideal raster moving trajectory. Because reasonable frequency characteristics are configured, fault tolerance to deviations in an actual process link of manufacturing the fiber scanner can be improved, the fiber scanner is more stable and controllable in an operating state, and a raster scanning trajectory is closer to an ideal trajectory. Therefore, an image display effect is ensured.

Figure 9:
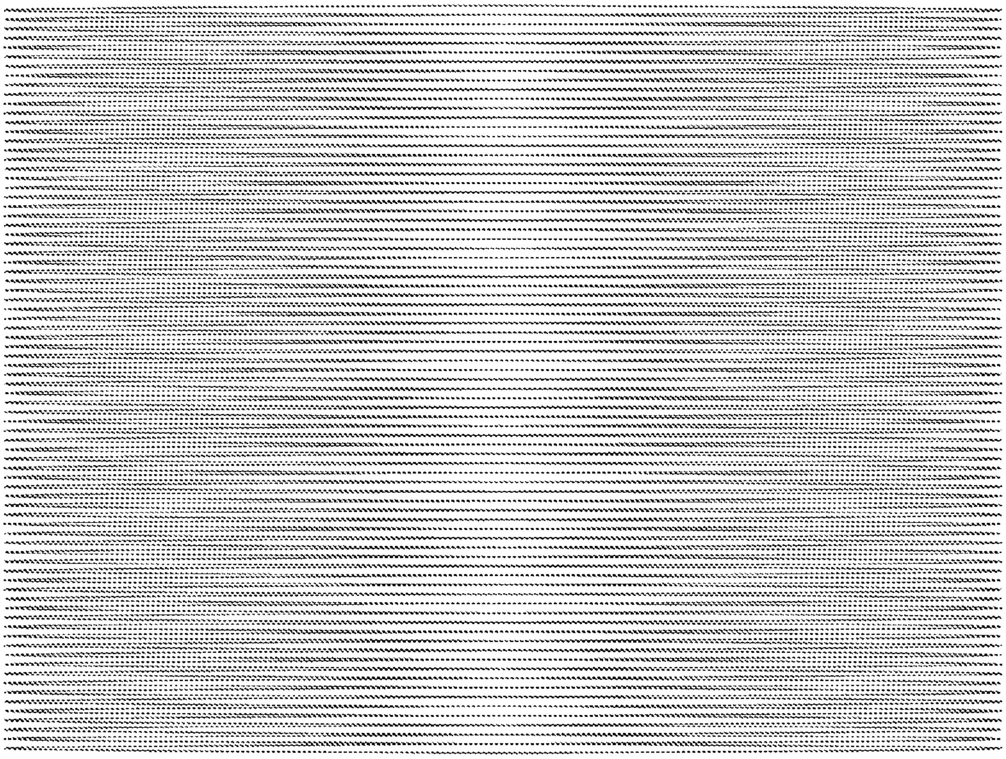
FIG. 9 is a schematic diagram of a raster scanning trajectory of a fiber scanner based on a configured frequency characteristic.

Based on the configured frequency characteristics of the fiber scanner, the raster scanning trajectory of the optical fiber in an operating state is shown in FIG. 9. It can be learned that compared with the scanning trajectories shown in FIG. 2 and FIG. 3, the raster scanning trajectory of the fiber scanner using the configured frequency characteristics is closer to an ideal trajectory.

Figure 10:
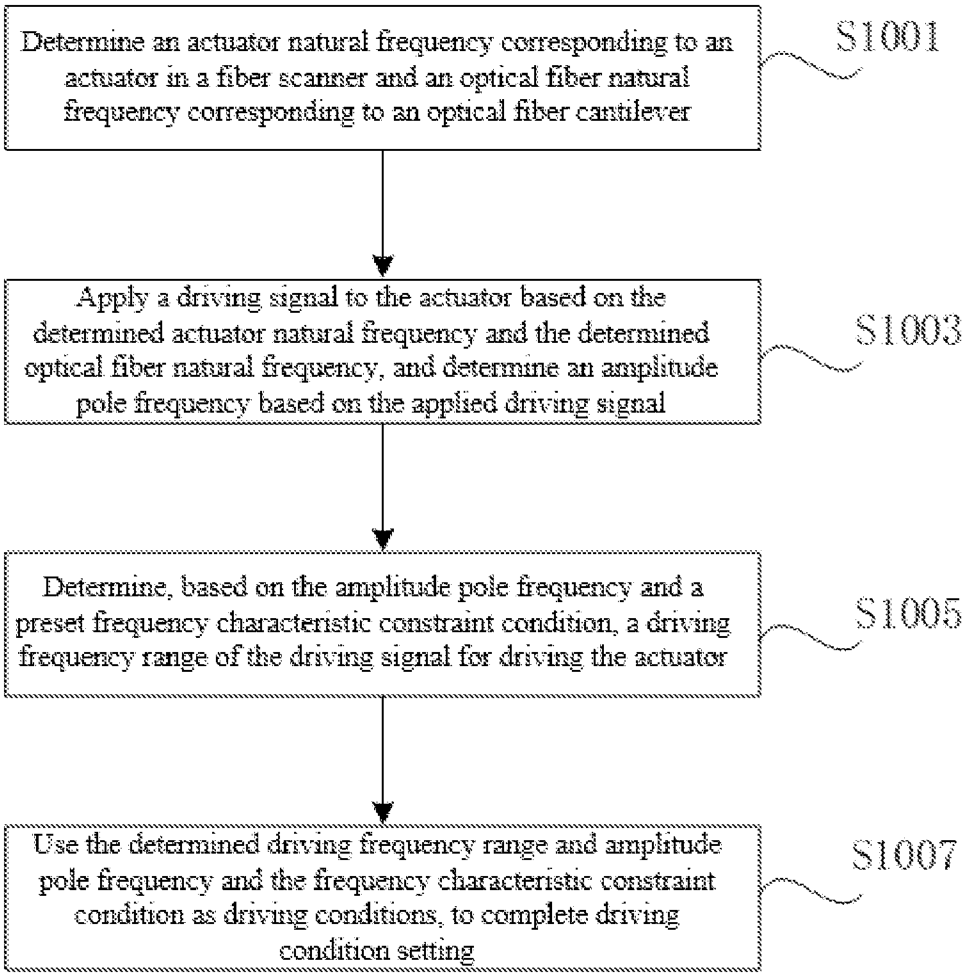
FIG. 10 is a schematic diagram of steps of a driving condition setting method for a scanning device according to an embodiment of this application.

Based on the foregoing frequency characteristics, a corresponding driving condition can be reasonably set for the fiber scanner using the raster scanning trajectory. In an embodiment of this application, a driving condition setting method for a fiber scanner is provided. FIG. 10 is a flowchart of the method. A structure described in the method may be based on the contents of the fiber scanner. The method specifically includes the following steps:

Step S1001: Determine an actuator natural frequency corresponding to an actuator in a fiber scanner and an optical fiber natural frequency corresponding to an optical fiber cantilever.

As described above, the actuator and the optical fiber cantilever in the fiber scanner each have a natural frequency, that is, the actuator natural frequency and the optical fiber natural frequency. In addition, it should be noted that in a raster scanning fiber scanner, a fast axis and a slow axis of an actuator have different natural frequencies. Therefore, the actuator natural frequency described herein further includes a slow axis natural frequency and a fast axis natural frequency. The actuator natural frequency and the optical fiber natural frequency each may be determined through finite element simulation, theoretical calculation, or the like based on one or more corresponding attributes. Certainly, a specific simulation or calculation process is not described in detail herein.

It should also be noted that the actuator natural frequency described in the step S1001 may be considered as an $i^{th}$-order natural frequency of the actuator, and correspondingly, the optical fiber natural frequency may be considered as a $j^{th}$-order natural frequency of the optical fiber. i and j are positive integers.

Step S1003: Apply a driving signal to the actuator based on the determined actuator natural frequency and the determined optical fiber natural frequency, and determine an amplitude-extrema frequency based on the applied driving signal.

In this embodiment of this application, the amplitude-extrema frequency may be considered as a frequency with a largest amplitude in a driving (voltage) signal spectrum. In practical application, the amplitude-extrema frequency can be acquired by an instrument, for example, an impedance analyzer, that has frequency acquisition and measurement functions. As a feasible implementation, a driving circuit may be adjusted and the frequency of the driving voltage signal applied to the actuator may be continuously changed, to determine the frequency with the largest amplitude (namely, the amplitude-extrema frequency). Specifically, the continuously changed frequency of the driving voltage signal is in a safe operating frequency range of the actuator, so that the actuator is not damaged. While the frequency of the driving voltage signal is adjusted, a spectrum of the driving voltage signal is acquired and detected by using a corresponding instrument (for example, the foregoing impedance analyzer), to find a frequency point with the largest amplitude in the spectrum as the amplitude-extrema frequency. Detailed acquisition is not described herein.

Step S1005: Determine, based on the amplitude-extrema frequency and a preset frequency characteristic constraint condition, a driving frequency range of the driving signal for driving the actuator. The frequency characteristic constraint condition includes that a quantity of significant peaks on a frequency characteristic curve does not exceed a set quantity in the determined driving frequency range.

Step S1007: Use the determined driving frequency range and amplitude-extrema frequency and the frequency characteristic constraint condition as driving conditions, to complete driving condition setting.

For the step S1001, a manner of determining the actuator natural frequency and the optical fiber natural frequency specifically includes: obtaining an actuator attribute corresponding to the actuator and an optical fiber attribute corresponding to the optical fiber in the fiber scanner, determining the actuator natural frequency based on the actuator attribute, and determining the optical fiber natural frequency based on the optical fiber attribute.

The actuator attribute described herein may include one or more attributes, including but not limited to: a material, a Young's modulus, a second axial moment of area, a density, a sectional area, a length, and/or a mode constant.

The optical fiber attribute described herein may also include one or more attributes, including but not limited to: an optical fiber cantilever length, a core diameter dimension, a material, and a refractive index.

Figure 3:
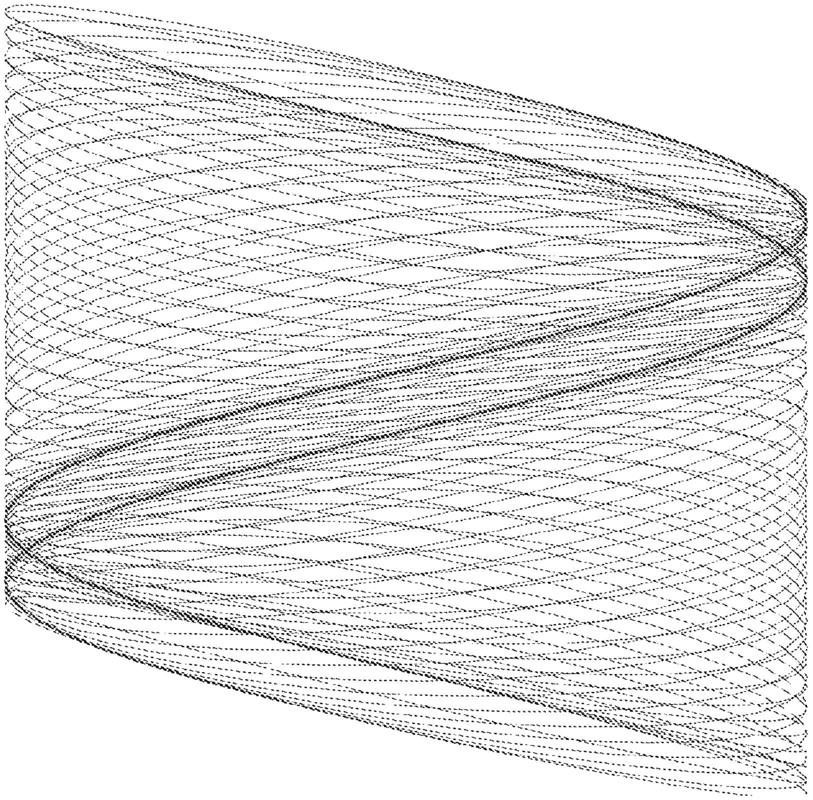
FIG. 3 is a schematic diagram of another raster scanning trajectory affected by nonlinearity.

In some implementations, the actuator attribute and the optical fiber attribute in the fiber scanner may be measured by a corresponding device (for example, a length measurement device and a material detection device). FIG. 3 shows an impedance characteristic curve of a fiber scanner. The impedance characteristic curve characterizes a curve of impedance characteristics of an actuator and an optical fiber. The impedance characteristic curve may reflect vibration characteristics of the actuator and the optical fiber in the fiber scanner, and a peak on the impedance characteristic curve corresponds to a specific natural frequency of the actuator or the optical fiber.

In an actual raster scanning process, two driving signals with different driving frequencies need to be respectively applied to two actuating portions of the actuator, resulting in that driving conditions of a fast axis and a slow axis in the actuator are different.

By performing the step S1003, an amplitude-extrema frequency $F_x0$ for a fast-axis actuating portion may be determined. Usually, the amplitude-extrema frequency may be considered as an acquired frequency with the largest amplitude that is in an optical fiber scanning trajectory time sequence spectrum or that is applied to the fast-axis actuating portion and that is in a driving signal spectrum.

In this application, for a spectrum positional relationship between an $i^{th}$-order natural frequency $Fk_i$ of the fast-axis actuating portion, a $j^{th}$-order natural frequency $Ff_j$ of the optical fiber cantilever, and the amplitude-extrema frequency $F_x0$ applied to the fast-axis actuating portion, reference may be made to the foregoing contents.

For step S1005, in this embodiment of this application, the preset frequency characteristic constraint condition further includes a frequency characteristic constraint condition of the fast-axis actuating portion and a frequency characteristic constraint condition of a slow-axis actuating portion.

The frequency characteristic constraint condition of the fast-axis actuating portion includes at least frequency range constraint coefficients and a quantity of thresholds of significant frequency peak values included in the frequency range. In some embodiments, the frequency characteristic constraint condition of the fast-axis actuating portion may be that the frequency range constraint coefficients include $0.6^*F_x0$ and $1.3^*F_x0$, and the quantity of thresholds of the significant frequency peak values is not more than 5. In some embodiments, the frequency characteristic constraint condition of the fast-axis actuating portion may be that a frequency difference between resonance frequencies F1 and F2 is greater than 1.2 KHz. In some embodiments, the frequency characteristic constraint condition of the fast-axis actuating portion may be that the frequency difference between the resonance frequencies F1 and F2 is less than 5 KHz. In some embodiments, the frequency characteristic constraint condition of the fast-axis actuating portion may be that a frequency difference between the driving frequency $F_x0$ and the resonance frequency F2 is less than 100 Hz.

The frequency characteristic constraint condition of the slow-axis actuating portion is related to the frequency characteristic constraint condition of the fast-axis actuating portion. In some embodiments, the frequency characteristic constraint condition of the slow-axis actuating portion may be that frequency range constraint coefficients include $0.6^*F_x0$ and $1.3^*F_x0$, and a quantity of thresholds of significant frequency peak values is 0. A phase curve presents clutter information similar to noise signals, and there is no obviously recognizable protrusion line shape. As for whether a peak on a curve is significant or not, reference may be made to the foregoing judgment contents of significance. Details are not described again.

Through the setting of the foregoing driving condition, fault tolerance to deviations in an actual process link of manufacturing the fiber scanner can be improved, the fiber scanner is more stable and controllable in an operating state, and a raster scanning trajectory of optical fiber scanning in the operating state is closer to an ideal trajectory. Therefore, an image display effect is ensured.

The foregoing contents are for a raster fiber scanner. In actual work, a Lissajous scanning trajectory may be used to implement scanning display. Unlike raster scanning, Lissajous scanning is a combination of periodic trajectory signals in two orthogonal directions (an x-axis direction and a y-axis direction). To take into account frequency characteristics of an optical fiber and a scanning utilization ratio, operating frequencies of two scanning axes of a scanner are usually close, and the operating frequencies of the two scanning axes are high frequencies. Therefore, because an operating mode is obviously different from that of the raster scanning, the frequency characteristics of the Lissajous scanning are also different from those of the raster scanning.

It should be noted that in some embodiments of this application, a frequency value ratio of two scanning axes of the Lissajous scanning is close to 1.

Figure 11:
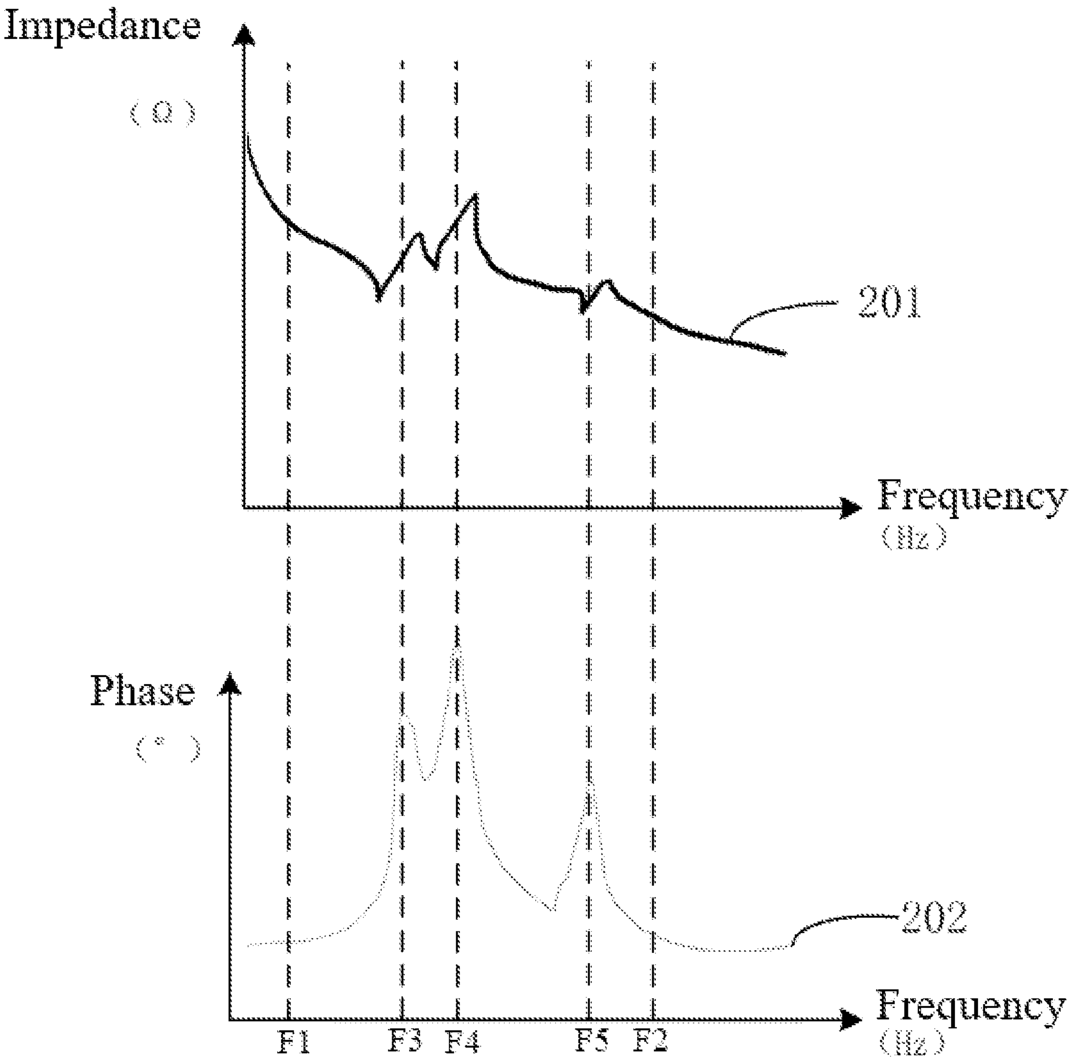
FIG. 11 shows a frequency characteristic curve of configured Lissajous scanning according to an embodiment of this application.

FIG. 11 shows a frequency characteristic curve of configured Lissajous scanning according to an embodiment of this application. An impedance curve 201 and a phase curve 202 are shown in FIG. 11, and F1 to F5 are resonance frequency points. In a scanning trajectory time sequence of an optical fiber or a driving voltage signal spectrum of a scanner, two most important spectrum components are F1 and F2, where F1<F2.

In a preferred example, a resonance frequency of a piezoelectric device and an optical fiber frequency are placed between the two driving frequencies F1, F2, to be specific:

$$F1<FPi\leq FFj<F2 \text{ or } F1<FFj\leq FPi<F2$$

FPi is an $i^{th}$-order resonance frequency of an actuator and FFj is a $j^{th}$-order resonance frequency of the optical fiber.

Further, similar to the raster scanning described above, a most significant peak can be found in the frequency range [F1, F2], and a frequency corresponding to the most significant peak is denoted as Fmax. If impedance differences corresponding to a plurality of peaks are close to each other and are different within 1%, a peak having the largest resonance frequency point phase is used as the most significant peak, and the frequency Fmax satisfies: F1≥0.7*Fmax, and F2≤1.3*Fmax.

In a preferred example, there are no more than five significant peaks in the frequency range [F1, F2].

It should be noted that in FIG. 11, F3, F4, F5 may all be resonance frequencies of the actuator, or may include a resonance frequency of the optical fiber. In a preferred example, the resonance frequency of the optical fiber and one of the resonance frequencies of the actuator are as close as possible. For example, F3 and F4 in FIG. 11 may be resonance frequencies of the optical fiber. Certainly, FIG. 11 is only an example. In practical application, the frequency range [F1, F2] may include four or five significant peaks, which should not be construed as a limitation on this application herein.

Figure 12:
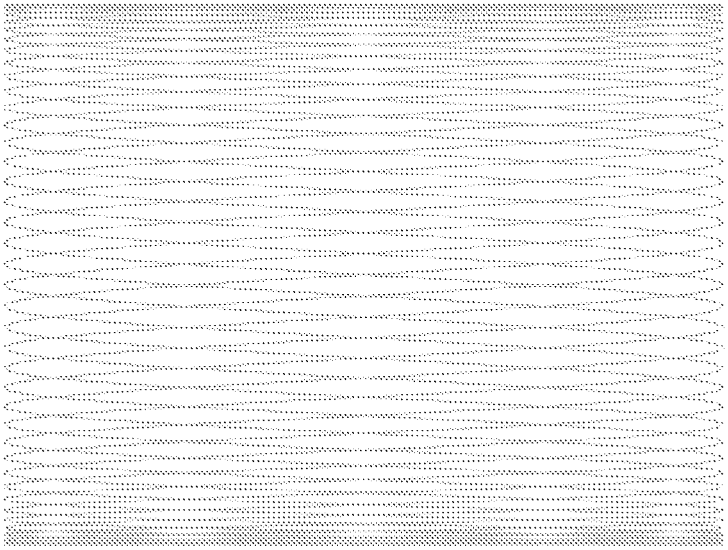
FIG. 12 shows a Lissajous scanning trajectory according to an embodiment of this application.

In some other embodiments of this application, the used Lissajous scanning may also refer to that there is a maximum frequency ratio between two scanning axes, in other words, the scanning trajectory of such Lissajous scanning is very close to a raster scanning trajectory. For example, FIG. 12 shows a Lissajous scanning trajectory when the frequency ratio of the two scanning axes is 240 Hz to 18 Hz.

For these embodiments, there are frequency characteristics similar to those corresponding to the raster scanning described above, and specifically, frequency characteristics corresponding to the Lissajous scanning are configured as follows:

In a frequency range (0.6*$F_x$0, 1.3*$F_x$0), there are no more than five significant peaks on the impedance curve. $F_x$0 is a frequency that is applied to a fast scanning axis and that has a largest amplitude in a driving (voltage) signal spectrum or a scanning trajectory response spectrum.

In a preferred example, there is no obvious resonance peak in a frequency range (n*F2−200, n*F2+200) on the impedance curve, where n=2, 3, 4, 5, . . . , or the like. F2 is a resonance frequency of the optical fiber.

In a preferred example, a driving frequency of a slow scanning axis is Fy, and on an impedance curve of the slow scanning axis, there is no resonance peak in a frequency range (0.9*n*Fy, 1.1*n*Fy), where n=2, 3, 4, 5, . . . , or the like.

By configuring the frequency characteristics described above for such a Lissajous scanning mode, on the one hand, the scanning mode is closer to raster scanning, a pixel display sequence is stronger, a display logic is simpler, chip processing is easier, hardware resources and overheads are saved, and especially, when a frequency ratio of the fast axis and the slow axis is further improved, more hardware resources are saved compared with Lissajous display with a similar frequency. On the other hand, if the driving frequency of the slow scanning axis is high, a resonance peak frequency is high when a fiber scanner is designed, which can improve anti-vibration performance of the device. Further, the driving frequency of the slow scanning axis can be closer to a resonance peak, to reduce a driving voltage. In addition, a nonlinear response is smaller, and a spectrum is purer, to facilitate image display.

Figure 13:
FIG. 13 is a schematic diagram of bending vibration of a piezoelectric ceramic tube according to an embodiment of this application.

Herein, it should be noted that the actuator may undergo vibration deformation during vibration. FIG. 13 shows exemplary vibration deformation of a slow-axis actuating portion or a fast-axis actuating portion in an actuator 11 in the form of a piezoelectric ceramic tube. Specifically, FIG. 13 shows an axial cross section of a part of a tube wall of the piezoelectric ceramic tube. A tube wall substrate 21 is made of a piezoelectric ceramic material, and electrodes 22 are disposed respectively on inner and outer surfaces of the tube wall substrate 21. When an external driving signal is applied to the electrodes 22, the tube wall substrate 21 generates a piezoelectric effect and generates a bending deformation. By applying the driving signal of a set frequency to the electrodes 22, the tube wall substrate 21 generates a bending deformation of the set frequency. In practical application, for a slow axis and a fast axis, electrodes are disposed at different positions, and frequencies of applied driving signals are different, so that the slow axis can generate a bending vibration in a first direction at a first frequency and the fast axis can generate a bending vibration in a second direction at a second frequency.

Figure 14:
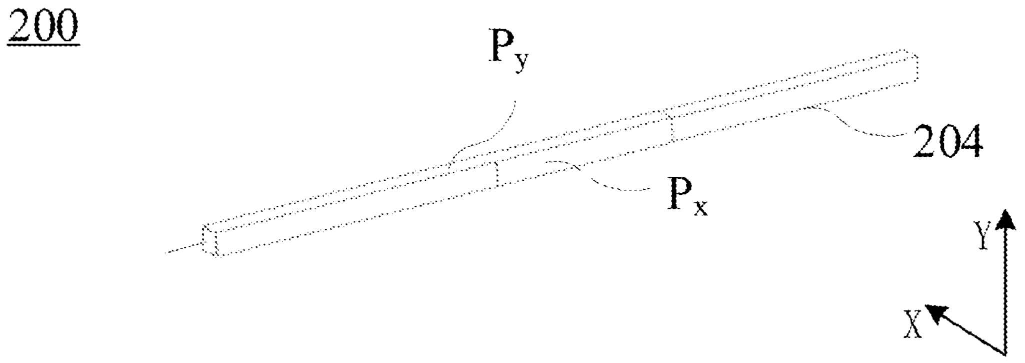
FIG. 14 shows another fiber scanner according to an embodiment of this application.

Further, in addition to a typical structure of the fiber scanner described above, the fiber scanner described in this application includes another structural form. FIG. 14 shows another fiber scanner 200 according to an embodiment of this application. Although an overall structure of the fiber scanner 200 also includes an actuator and an optical fiber, the actuator does not have the structure shown in FIG. 1*a* in which fast and slow axes are independent of each other. It can be learned from FIG. 14 that an overall shape of the actuator is a square column shape, and electrodes are attached to its four column surfaces (only two column surfaces are shown in FIG. 14), to form a four-part electrode type structure. A driving signal of a first frequency is applied to an electrode $P_y$ in the Y-axis direction, to actuate the actuator in the Y-axis direction; a driving signal of a second frequency is applied to an electrode $P_x$ in the X-axis direction, to actuate the actuator in the X-axis direction. A fixing portion 204 is used for connection and fixing with a fixing structure, for example, a base. For the fiber scanner 200, two sides of the actuator to which electrodes $P_y$ are attached may be considered as a first actuating portion, and two sides of the actuator to which electrode $P_x$ are attached may be considered as a second actuating portion. An actuation mode of the fiber scanner 200 is also piezoelectric actuation, and a bending vibration mode may be used. For the actuation mode, refer to the content corresponding to FIG. 1B, and details are not described herein again.

Figure 15:
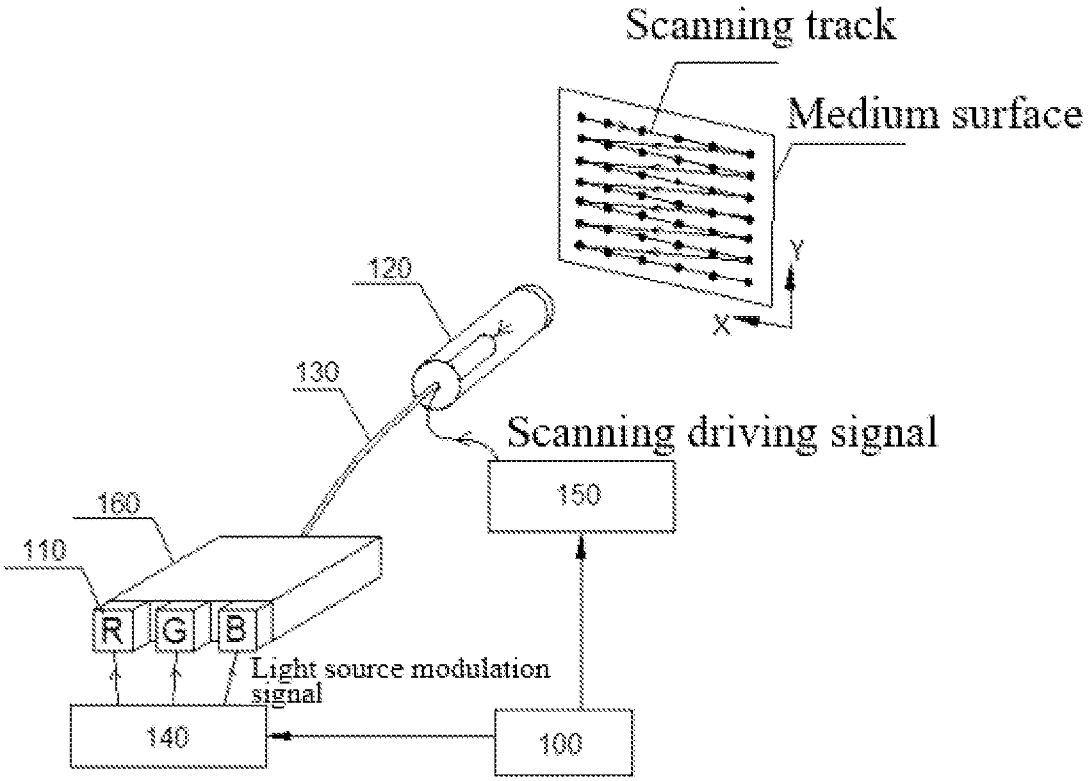
FIG. 15 is a schematic diagram of a scanning display module according to an embodiment of this application.

In this embodiment of this application, based on the foregoing fiber scanner, a scanning display module is further provided, including a scanning device, a light source, and a control circuit. With reference to FIG. 15, an exemplary scanning display module includes a processing unit 100, a laser light source module 110, a scanner module 120, an optical fiber 130, a light source modulation circuit 140, a scanning driving circuit 150, and a beam combining unit 160.

The processing unit 100 is a control circuit, and may be a graphics processing unit (Graphics Processing Unit, GPU), a central processing unit (Central Processing Unit, CPU), another chip or circuit having a control function and an image processing function, or a combination of the chip and the circuit. This is not specifically limited herein.

In operation, the processing unit 100 may control the light source modulation circuit 140 to modulate the laser light source module 110 based on image data to be displayed. The laser light source module 110 includes a plurality of monochromatic lasers each emitting a light beam of a different color. It can be learned from FIG. 16, a laser group may specifically include lasers of three colors: red (Red, R), green (Green, G), and blue (Blue, B). Light beams emitted from the lasers in the laser light source module 110 are combined into one laser beam by the beam combining unit 160, and the combined laser beam is coupled into the optical fiber 130.

The processing unit 100 may also control the scanning driving circuit 150 to drive the scanner module 120 to perform scanning, to scan and output an image light beam transmitted in the optical fiber 130.

The light beam scanned and output by the scanner module 120 acts on a specific pixel on a medium surface, and forms a light spot at the pixel. In an actual scanning process, a light beam output by the optical fiber 130 forms, based on a set raster scanning trajectory, a light spot having corresponding image information (such as, a color, a gray level, or brightness) at each pixel. In a frame of time, the light beam traverses each pixel at a fast enough speed to complete scanning of a frame of image. Because of a "persistence of vision" characteristic of a human eye when observing things, the human eye cannot perceive the movement of the light beam on each pixel, but sees a frame of complete image.

Figure 16:
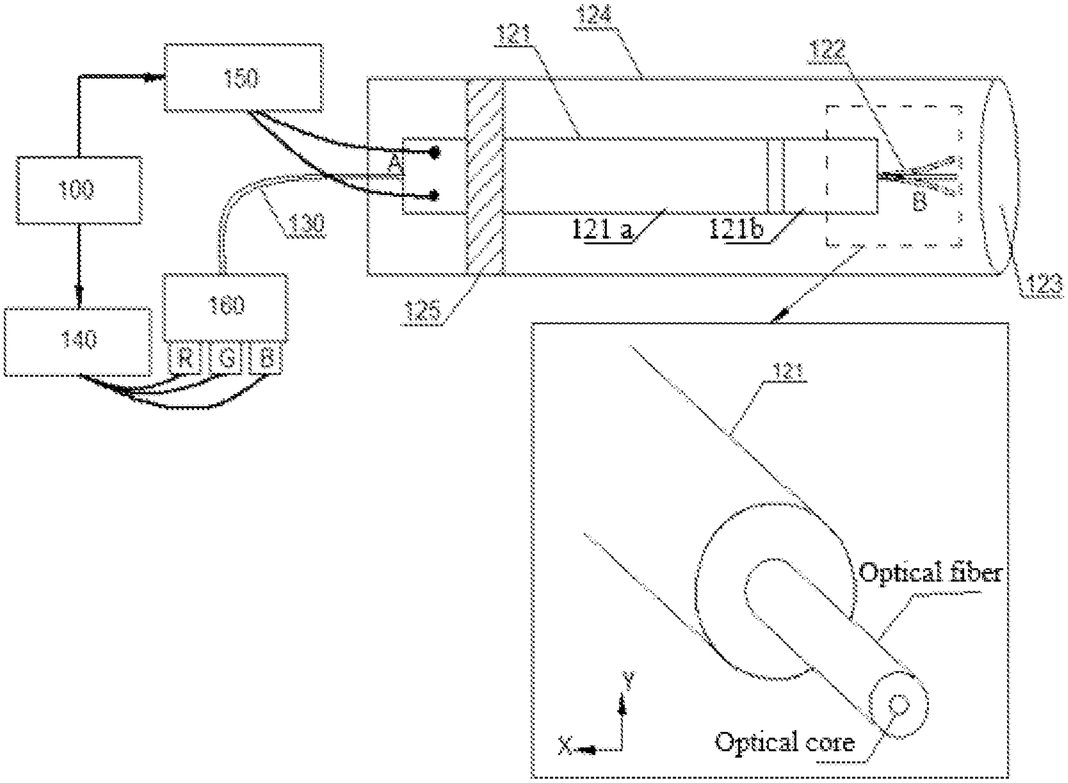
FIG. 16 is a schematic diagram of a specific structure of the scanning display module shown in FIG. 15.

With continued reference to FIG. 16, an exemplary specific structure of the scanner module 120 includes an actuator 121, an optical fiber cantilever 122, a lens assembly 123, a scanner encapsulation housing 124, and a fastener 125. The actuator 121 is fastened in the scanner encapsulation housing 124 through the fastener 125, and a channel in a length axis direction is disposed on the actuator 121, and an optical fiber 130 penetrates through the channel and extends at the front end of the actuator 121 to form the optical fiber cantilever 122. In operation, when the actuator 121 is driven by a scanning driving signal, a slow axis 121*a* (also referred to as a first actuating portion) of the actuator 121 vibrates in a vertical direction (the vertical direction is parallel to the Y axis in a reference coordinate system in FIG. 15 and FIG. 16, and may also be referred to as a first direction in this application), and a fast axis 121*b* (also referred to as a second actuating portion) of the actuator 121 vibrates in a horizontal direction (the horizontal direction is parallel to the X axis in the reference coordinate system in FIG. 15 and FIG. 16, and may also be referred to as a second direction in this application). Driven by the actuator 121, the front end of the optical fiber cantilever 122 performs two-dimensional scanning based on a preset raster trajectory and emits a light beam according to a predetermined grid format trajectory, and the emitted a light beam, and the emitted light beam can be transmitted through the lens assembly 123 to implement scanning imaging. Generally, only a structure constituted by the actuator 121 and the optical fiber 130 (including the optical fiber cantilever 122 extending at the front end) may be referred to as a fiber scanner (Fiber Scanner).

The first direction and the second direction are orthogonal to each other.

It should be noted that, in this embodiment of this application, a description manner of a "back end" and a "front end" that are used is usually determined based on a direction of beam transmission, that is, a direction from front to back is consistent with a direction of beam transmission. A back end of the actuator refers to an end used by the actuator as a fixed end. A front end of the actuator refers to the other end of the actuator opposite to the back end. In some embodiments, the front end may also be referred to as a free end, and is a part with most significant deformation and amplitude on the actuator. In addition, a light output end of the optical fiber cantilever may also be referred to as a front end of the optical fiber cantilever or a free end of the optical fiber cantilever. Certainly, a definition and explanation of a concept such as a free end, a front end, or a back end herein are also applicable to an actuator, an optical fiber cantilever, or another structure in another embodiment of this application. However, it should be noted that in subsequent embodiments of this application, for some structures that do not have the foregoing concepts of "front" and "back", descriptions such as "fixed end" and "free end" are directly used.

Certainly, such descriptions are merely intended to facilitate accurate and intuitive understanding by a person skilled in the art, but should not be considered as a limitation on this application.

The foregoing illustrative scanning display module is merely for ease of understanding an exemplary content provided in a subsequent solution of this application. In actual applications, the specific arrangement in the scanning display module and the structure of each unit are not limited to FIG. 15 and FIG. 16, and may change. For example, the light source modulation circuit 140 and the scanning driving circuit 150 may be combined into a processing circuit. For another example, the processing unit 100 may be independent of the scanning display module, and is not used as a constituent unit in the scanning display module. For another example, the actuator 121 in the scanner module 120 is fastened by using a base instead of the fastener 125 in FIG. 16. For different variation forms, details are not described herein again. That is, the foregoing exemplary content should not be construed as a limitation on this application.

In addition, it should be noted that, in the foregoing embodiment, a scenario in which a scanning device is a fiber scanner is used as an example to describe corresponding frequency characteristics. However, for another type of scanning device, for example, a micro-electro-mechanical system (Micro-Electro-Mechanical Systems, MEMS) scanning mirror, a two-dimensional galvanometer (which also has two scanning axes) is used to implement laser beam deflection (a raster scanning trajectory or a Lissajous scanning trajectory), and this type of scanning device has a strong nonlinear and coupling function. The frequency characteristics described in this application are also applicable to such a scanning device.

Figure 18:
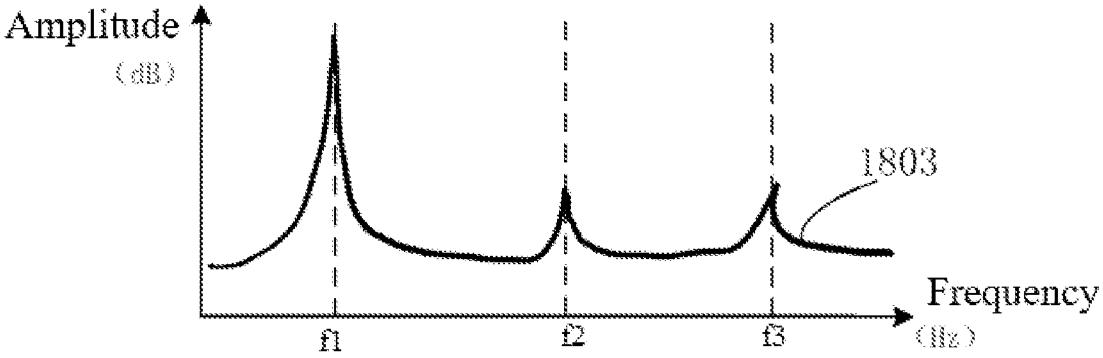
FIG. 18 shows a frequency characteristic curve of a MEMS scanning mirror according to an embodiment of this application.

Specifically, a frequency characteristic of a scanning axis of the MEMS scanning mirror may be measured by using a vibration tester, a modal analyzer, or the like. FIG. 18 shows an amplitude-frequency response curve 1803 of the MEMS scanning mirror. In FIG. 18, a horizontal axis represents a frequency, and f1 to f3 represent resonance frequencies of different orders; and a vertical axis represents variations of a vibration response amplitude (displacement or angle) of a vibration system, namely, the MEMS scanning mirror, as the frequency varies. Two scanning axes of the MEMS scanning mirror also follow the foregoing frequency characteristics. For details, refer to the foregoing contents. Therefore, the details are not described herein again.

The expressions "first", "second", "the first", or "the second" used in the embodiments of the present application may modify various components regardless of sequence and/or importance, but these expressions do not limit corresponding components. The foregoing expressions are only configured to distinguish components from other components.

The foregoing descriptions are only preferred embodiments of this application and descriptions of applied technical principles. A person skilled in the art should understand that the scope of the present application in this application is not limited to a technical solution formed by a specific combination of the foregoing technical features, but also covers another technical solution formed by any combination of the foregoing technical features or equivalent features without departing from the foregoing inventive concept, for example, a technical solution formed through mutual replacement between the foregoing features and the technical features that are disclosed in (but are not limited to) this application and that have similar functions.

What is claimed is:

1. A scanning device for performing raster scanning in an operating state, comprising:

two scanning axes configured to vibrate in a first direction and a second direction, the two scanning axes have different frequency characteristics, and the frequency characteristics of the two scanning axes satisfy:

a quantity of significant peaks on a frequency characteristic curve does not exceed 5 in a set frequency range of [0.6*$F_x$0, 1.3*$F_x$0], wherein $F_x$0 is a frequency that is applied to a fast scanning axis and that has a largest amplitude in a driving signal spectrum or in a scanning trajectory response spectrum.

2. The scanning device according to claim 1, wherein the set frequency range is determined based on driving frequencies applied to the scanning axes.

3. The scanning device according to claim 2, wherein the driving frequencies comprise:

a frequency having a largest amplitude in the driving signal spectrum applied to the scanning axes, or a frequency having a largest amplitude in the scanning trajectory response spectrum of the scanning axes.

4. The scanning device according to claim 2, wherein the driving frequencies applied to the two scanning axes are different.

5. The scanning device according to claim 1, wherein the frequency characteristic curve comprises at least one of an impedance curve, a phase curve, or a frequency amplitude response curve.

6. The scanning device according to claim 1, wherein the scanning device comprises at least one of an optical fiber scanner or a micro-electro-mechanical system (MEMS) scanning mirror.

7. The scanning device according to claim 1, wherein the scanning device is an optical fiber scanner, the two scanning axes comprise a first actuating portion and a second actuating portion, the scanning device further comprises an optical fiber cantilever, a driving frequency of the first actuating portion is smaller than that of the second actuating portion, the first actuating portion and the second actuating portion drive the optical fiber cantilever to scan along a raster trajectory, and the frequency characteristic curve comprises at least one of an impedance curve and a phase curve.

8. The scanning device according to claim 7, wherein the driving frequency comprises a frequency having a largest amplitude in a driving signal spectrum or a scanning trajectory response spectrum applied to the first actuating portion or the second actuating portion.

9. The scanning device according to claim 8, wherein the scanning trajectory response spectrum is a spectrum of a response signal generated by a sub-vibration system comprising the optical fiber cantilever and one of the first and second actuating portions, in response to a driving signal applied to the first or second actuating portion.

10. The scanning device according to claim 9, wherein a frequency characteristic of the sub-vibration system comprising the optical fiber cantilever and one of the first and second actuating portions satisfies: the quantity of significant peaks on at least one of an impedance curve or a phase curve does not exceed 5 in the frequency range $[0.6*F_x\mathbf{0}, 1.3*F_x\mathbf{0}]$; and

- a frequency difference between resonance frequencies of the second actuating portion and the optical fiber cantilever is greater than 1.2 KHz; or
- a frequency difference between resonance frequencies of the second actuating portion and the optical fiber cantilever is less than 5 KHz.

11. The scanning device according to claim 10, wherein a frequency difference between the driving frequency corresponding to the second actuating portion and a resonance frequency of the optical fiber cantilever is less than 100 Hz.

12. The scanning device according to claim 10, wherein

- the sub-vibration system constituted by the second actuating portion and the optical fiber cantilever satisfies a frequency characteristic: in a frequency range $(n*F_x\mathbf{0}-200\text{ Hz}, n*F_x\mathbf{0}+200\text{ Hz})$, a quantity of significant peaks on an impedance curve and/or a phase curve is 0, wherein $F_x0$ is the driving frequency of the second actuating portion, and n is a natural number greater than or equal to 2; or
- resonance frequencies of the first actuating portion and the optical fiber cantilever satisfy a frequency characteristic: in a frequency range $(n*Fm-20, n*Fm+20)$, a quantity of significant peaks on an impedance curve or a phase curve is 0, wherein Fm is a resonance frequency of the first actuating portion, and n is a natural number greater than or equal to 2.

13. The scanning device according to claim 10, wherein a significant peak of a frequency characteristic curve of the second actuating portion and the optical fiber cantilever does not coincide with a significant peak of a frequency characteristic curve of the first actuating portion and the optical fiber cantilever.

14. The scanning device according to claim 10, wherein in a frequency range corresponding to the frequency characteristic curve, there is no significant peak in a frequency range that is different from a driving frequency of the second actuating portion by 500 Hz.

15. The scanning device according to claim 14, wherein

- a most significant peak in the frequency range corresponding to the frequency characteristic curve satisfies: $(Z_{mx}-Z_{mn})/(Z_{mx}+Z_{mn})\leq 5\%$, wherein $Z_{mx}$ is an impedance or phase maximum value corresponding to the most significant peak, and $Z_{mn}$ is an impedance or phase minimum value corresponding to a peak adjacent to the most significant peak on the impedance curve or the phase curve; or
- on the frequency characteristic curve, a frequency difference between adjacent peaks of the driving frequency of the second actuating portion is less than 80 Hz.

16. The scanning device according to claim 10, wherein a quantity of resonance peaks in a frequency range $(0.9*n*F_y, 1.1*n*F_y)$ is 0, wherein $F_y$ is the driving frequency applied to the first actuating portion, and n is a natural number greater than or equal to 2.

17. A method for setting a driving condition of a scanning device according to claim 1, the method comprising:

- determining a natural frequency corresponding to the fast scanning axis in the scanning device;
- applying a driving signal to the fast scanning axis based on the determined natural frequency, and determining the frequency that is applied to the fast scanning axis and that has the largest amplitude in the driving signal spectrum or the scanning trajectory response spectrum based on the driving signal;
- determining, based on the frequency that is applied to the fast scanning axis and that has the largest amplitude in the driving signal spectrum or the scanning trajectory response spectrum and the quantity of the significant peaks on the frequency characteristic curve, the set frequency range of the driving signal for driving the fast scanning axis; and
- using the set frequency range, the frequency that is applied to the fast scanning axis and that has the largest amplitude in the driving signal spectrum or the scanning trajectory response spectrum, and the quantity of the significant peaks on the frequency characteristic curve as driving conditions of the scanning device, to complete driving condition setting.

18. A scanning display module, comprising at least a scanning device, a light source, and a control circuit, wherein

- the scanning device performs raster scanning in an operating state and comprises two scanning axes configured to vibrate in a first direction and a second direction, the two scanning axes have different frequency characteristics, and the frequency characteristics of the two scanning axes satisfy that a quantity of significant peaks on a frequency characteristic curve does not exceed 5 in a set frequency range of $[0.6*F_x\mathbf{0}, 1.3*F_x\mathbf{0}]$, wherein $F_x\mathbf{0}$ is a frequency that is applied to a fast scanning axis and that has a largest amplitude in a driving signal spectrum or in a scanning trajectory response spectrum; and
- under the control of the control circuit, the light source outputs image light, and then the scanning device outputs the image light to implement scanning display.

19. The scanning display module according to claim 18, wherein the scanning device comprises at least one of an optical fiber scanner or a MEMS scanning mirror.

20. A scanning device for performing raster scanning in an operating state, comprising:

two scanning axes configured to vibrate in a first direction and a second direction, the two scanning axes have different frequency characteristics, and the frequency characteristics of the two scanning axes satisfy:

a quantity of significant peaks on a frequency characteristic curve does not exceed a set quantity in a set frequency range, wherein the scanning device is an optical fiber scanner, the two scanning axes comprise a first actuating portion and a second actuating portion, the scanning device further comprises an optical fiber cantilever, a driving frequency of the first actuating portion is smaller than that of the second actuating portion, the first actuating portion and the second actuating portion drive the optical fiber cantilever to scan along a raster trajectory, and the frequency characteristic curve comprises at least one of an impedance curve and a phase curve, wherein the driving frequency comprises a frequency having a largest amplitude in a driving signal spectrum or a scanning trajectory response spectrum applied to the first actuating portion or the second actuating portion, wherein the scanning trajectory response spectrum is a spectrum of a response signal generated, in response to a response to a driving signal on the first or second actuating portion, by a sub-vibration system constituted by the first or second actuating portion and the optical fiber cantilever, and wherein a frequency characteristic of the sub-vibration system constituted by the first or second actuating portion and the optical fiber cantilever satisfies: a quantity of significant peaks on at least one of an impedance curve or a phase curve does not exceed 5 in a frequency range [0.6*Fx0, 1.3*Fx0], wherein Fx0 is a frequency that is applied to a fast scanning axis and that has a largest amplitude in the driving signal spectrum or in the scanning trajectory response spectrum; and a frequency difference between resonance frequencies of the second actuating portion and the optical fiber cantilever is greater than 1.2 KHz; or a frequency difference between resonance frequencies of the second actuating portion and the optical fiber cantilever is less than 5 KHz.

* * * * *